US012244519B2

(12) United States Patent
Agrawal et al.

(10) Patent No.: US 12,244,519 B2
(45) Date of Patent: *Mar. 4, 2025

(54) LINK AGGREGATION GROUP FAILOVER FOR MULTICAST

(71) Applicant: Barefoot Networks, Inc., Santa Clara, CA (US)

(72) Inventors: Anurag Agrawal, Santa Clara, CA (US); Julianne Zhu, Los Gatos, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,094

(22) Filed: Aug. 1, 2023

(65) Prior Publication Data

US 2024/0073158 A1 Feb. 29, 2024

Related U.S. Application Data

(60) Continuation of application No. 17/346,035, filed on Jun. 11, 2021, now Pat. No. 11,716,291, which is a (Continued)

(51) Int. Cl.
*H04W 56/00* (2009.01)
*H04L 45/00* (2022.01)
(Continued)

(52) U.S. Cl.
CPC .......... *H04L 49/201* (2013.01); *H04L 45/245* (2013.01); *H04L 45/38* (2013.01);
(Continued)

(58) Field of Classification Search
CPC ....... H04L 45/38; H04L 45/245; H04L 45/48; H04L 45/745; H04L 49/201; H04L 49/557; H04L 49/901
See application file for complete search history.

(56) References Cited

U.S. PATENT DOCUMENTS 4,490,785 A 12/1984 Strecker et al.
5,068,892 A 11/1991 Livanos
(Continued)

OTHER PUBLICATIONS

U.S. Appl. No. 16/048,202, filed Jul. 27, 2018, Chaitanya Kodeboyina.
(Continued)

*Primary Examiner* — Jamal Javaid
(74) *Attorney, Agent, or Firm* — Compass IP Law PC

(57) ABSTRACT

A method of multicasting packets by a forwarding element that includes several packet replicators and several egress pipelines. Each packet replicator receives a data structure associated with a multicast packet that identifies a multicast group. Each packet replicator identifies a first physical egress port of a first egress pipeline for sending the multicast packet to a member of the multicast group. The first physical egress port is a member of LAG. Each packet replicator determines that the first physical egress port is not operational and identifies a second physical port in the LAG for sending the multicast packet to the member of the multicast group. When a packet replicator is connected to the same egress pipeline as the second physical egress, the packet replicator provides the identification of the second physical egress port to the egress pipeline to send the packet to the multicast member. Otherwise the packet replicator drops the packet.

19 Claims, 15 Drawing Sheets

Related U.S. Application Data division of application No. 16/548,833, filed on Aug. 22, 2019, now Pat. No. 11,271,869, which is a continuation of application No. 15/449,969, filed on Mar. 5, 2017, now Pat. No. 10,404,619.

(51) Int. Cl.

| | |
|---|---|
| ***H04L 45/24*** | (2022.01) |
| ***H04L 45/48*** | (2022.01) |
| ***H04L 45/7453*** | (2022.01) |
| ***H04L 49/201*** | (2022.01) |
| ***H04L 49/55*** | (2022.01) |
| ***H04L 49/901*** | (2022.01) |

(52) U.S. Cl.

CPC .......... *H04L 45/48* (2013.01); *H04L 45/7453* (2013.01); *H04L 49/555* (2013.01); *H04L 49/557* (2013.01); *H04L 49/901* (2013.01)

(56) References Cited

U.S. PATENT DOCUMENTS

| | | | |
|---|---|---|---|
| 5,757,795 | A | 5/1998 | Schnell |
| 5,987,521 | A | 11/1999 | Arrowood et al. |
| 7,110,404 | B1 | 9/2006 | Temoshenko |
| 7,120,834 | B1 * | 10/2006 | Bishara ................. H04L 49/552 714/43 |
| 7,190,696 | B1 | 3/2007 | Manur et al. |
| 7,664,873 | B1 | 2/2010 | Ghosh et al. |
| 7,953,089 | B1 | 5/2011 | Ramakrishnan et al. |
| 8,553,582 | B1 | 10/2013 | Mizrahi et al. |
| 9,319,347 | B1 | 4/2016 | Sindhu et al. |
| 9,559,985 | B1 | 1/2017 | Ye et al. |
| 9,565,114 | B1 | 2/2017 | Kabbani et al. |
| 9,571,400 | B1 | 2/2017 | Mandal et al. |
| 9,608,913 | B1 | 3/2017 | Kabbani et al. |
| 9,680,749 | B2 | 6/2017 | Labonte et al. |
| 9,860,081 | B2 | 1/2018 | Keesara et al. |
| 9,876,719 | B2 | 1/2018 | Revah et al. |
| 10,063,407 | B1 | 8/2018 | Kodeboyina et al. |
| 10,237,206 | B1 | 3/2019 | Agrawal et al. |
| 10,313,231 | B1 | 6/2019 | Bosshart |
| 10,404,619 | B1 | 9/2019 | Agrawal et al. |
| 10,728,173 | B1 | 7/2020 | Agrawal et al. |
| 11,271,869 | B1 | 3/2022 | Agrawal et al. |
| 11,716,291 | B1 * | 8/2023 | Agrawal ............... H04L 45/245 370/390 |
| 2001/0042130 | A1 | 11/2001 | Brown |
| 2002/0141403 | A1 | 10/2002 | Akahane et al. |
| 2002/0159466 | A1 | 10/2002 | Rhoades |
| 2003/0204631 | A1 | 10/2003 | Pinkerton et al. |
| 2004/0091104 | A1 | 5/2004 | Kawamura et al. |
| 2004/0235480 | A1 | 11/2004 | Rezaaifar et al. |
| 2005/0078601 | A1 | 4/2005 | Moll et al. |
| 2005/0147095 | A1 | 7/2005 | Guerrero et al. |
| 2006/0045088 | A1 | 3/2006 | Nguyen |
| 2006/0232447 | A1 | 10/2006 | Walker et al. |
| 2006/0245361 | A1 | 11/2006 | Cheethirala et al. |
| 2007/0047453 | A1 | 3/2007 | Bender et al. |
| 2007/0053283 | A1 | 3/2007 | Bidwell et al. |
| 2007/0086364 | A1 | 4/2007 | Ellis et al. |
| 2007/0177594 | A1 | 8/2007 | Kompella |
| 2007/0250713 | A1 | 10/2007 | Rahman et al. |
| 2008/0114892 | A1 | 5/2008 | Bruno et al. |
| 2008/0151890 | A1 | 6/2008 | Zelig et al. |
| 2009/0307241 | A1 | 12/2009 | Schimunek et al. |
| 2010/0020680 | A1 | 1/2010 | Salam et al. |
| 2012/0020206 | A1 | 1/2012 | Busi et al. |
| 2013/0028072 | A1 | 1/2013 | Addanki |
| 2013/0083660 | A1 | 4/2013 | Rajagopalan et al. |
| 2013/0177016 | A1 | 7/2013 | Nakano et al. |
| 2013/0279504 | A1 | 10/2013 | Gulati et al. |
| 2013/0322231 | A1 | 12/2013 | Császár et al. |
| 2013/0322232 | A1 | 12/2013 | Császár et al. |
| 2013/0322457 | A1 * | 12/2013 | Budhia ................. H04L 45/245 370/401 |
| 2014/0040477 | A1 | 2/2014 | King et al. |
| 2015/0055652 | A1 | 2/2015 | Yong et al. |
| 2015/0127701 | A1 | 5/2015 | Chu et al. |
| 2015/0295818 | A1 | 10/2015 | Hayashitani et al. |
| 2015/0312135 | A1 | 10/2015 | Velayudhan et al. |
| 2016/0142220 | A1 | 5/2016 | Hao et al. |
| 2016/0142315 | A1 | 5/2016 | Tomonaga et al. |
| 2016/0154756 | A1 | 6/2016 | Dodson et al. |
| 2016/0191361 | A1 | 6/2016 | Behera et al. |
| 2017/0295500 | A1 | 10/2017 | Sun et al. |
| 2017/0302504 | A1 | 10/2017 | Wang et al. |
| 2020/0313955 | A1 | 10/2020 | Kodeboyina et al. |
| 2021/0194800 | A1 | 6/2021 | Bosshart |

OTHER PUBLICATIONS

U.S. Appl. No. 16/271,624, filed Feb. 8, 2019, Anurag Agrawal.

U.S. Appl. No. 16/378,491, filed Apr. 8, 2019, Patrick Bosshart.

U.S. Appl. No. 16/548,833, filed Aug. 22, 2019, Anurag Agrawal.

"L2 EtherChannel Load Balancing", Cisco Community, https://www.cisco.com/c/en/us/support/docs/lan-switching/etherchannel/12023-4.html, Jun. 30, 2015, 11 pages.

Advisory Action for U.S. Appl. No. 15/094,987, Mailed Sep. 6, 2018, 4 pages.

Ahmadi, Mahmood, et. al., "Hashing Functions Performance in Packet Classification", Computer Engineering Laboratory, Delft University of Technology, Jan. 2007, 6 pages.

Eisenbud, Daniel E., et al., "Maglev: A Fast and Reliable Software Network Load Balancer," 13th USENIX Symposium on Networked Systems Design and Implementation Mar. 16, 2016, 13 pages, USENIX Association, Santa Clara, CA, USA.

Fan, Bin, et al., "Small Cache, Big Effect: Provable Load Balancing for Randomly Partitioned Cluster Services," SOCC'11, 2nd ACM Symposium on Cloud computing, Oct. 27-28, 2011, 12 pages, ACM, Cascais, Portugal.

Final Office Action for U.S. Appl. No. 15/094,987, Mailed Apr. 4, 2018, 13 pages.

Final Office Action for U.S. Appl. No. 16/048,202, Mailed Apr. 30, 2020, 22 pages.

Final Office Action for U.S. Appl. No. 16/378,491, Mailed Sep. 17, 2020, 12 pages.

Final Office Action for U.S. Appl. No. 16/548,833, Mailed Jun. 7, 2021, 17 pages.

First Office Action for U.S. Appl. No. 15/094,987, Mailed Sep. 21, 2017, 16 pages.

First Office Action for U.S. Appl. No. 15/150,015, Mailed Dec. 29, 2017, 16 pages.

First Office Action for U.S. Appl. No. 15/449,974, Mailed Jun. 1, 2018, 19 pages.

First Office Action for U.S. Appl. No. 16/048,202, Mailed Sep. 26, 2019, 21 pages.

First Office Action for U.S. Appl. No. 16/271,624, Mailed Oct. 31, 2019, 26 pages.

First Office Action for U.S. Appl. No. 16/378,491, Mailed Feb. 21, 2020, 13 pages.

First Office Action for U.S. Appl. No. 16/548,833, Mailed Dec. 9, 2020, 14 pages.

First Office Action for U.S. Appl. No. 16/903,305, Mailed Mar. 24, 2021, 17 pages.

First Office Action for U.S. Appl. No. 17/152,658, Mailed Oct. 14, 2022, 12 pages.

First Office Action for U.S. Appl. No. 17/346,035, Mailed Aug. 23, 2022, 11 pages.

Notice of Allowance for U.S. Appl. No. 16/903,305, Mailed Dec. 9, 2021, 13 pages.

Notice of Allowance for U.S. Appl. No. 16/271,624, Mailed Mar. 17, 2020, 13 pages.

Notice of Allowance for U.S. Appl. No. 17/346,035, Mailed Mar. 7, 2023, 7 pages.

(56) References Cited

OTHER PUBLICATIONS

Shantharama, Prateek, et al., "Hardware-Accelerated Platforms and Infrastructures for Network Functions: A Survey of Enabling Technologies and Research Studies". IEEEAccess, Jul. 29, 2020, 65 pages.

* cited by examiner

500

| Direction (595) | Name (590) | |
|---|---|---|
| I/O | Ingress port | 505 |
| I/O | Packer replicator FIFO identification | 510 |
| I | Hash 1 | 515 |
| I | Hash 2 | 520 |
| I | Multicast group 1 valid flag | 525 |
| I | Multicast group 1 identification | 530 |
| | ⋮ | |
| I | Multicast group n valid flag | 535 |
| I | Multicast group n identification | 540 |
| I | Copy for CPU valid flag | 545 |
| I | Ingress level 1 exclusion identification (XID) | 550 |
| I | Ingress level 2 port list exclusion identification (YID) | 555 |
| I | Ingress replication identification (RID) | 560 |
| O | Egress replication identification (RID) | 565 |
| O | First | 570 |
| O | Last | 575 |
| O | Drop | 580 |
| O | Egress port | 585 |

*Fig. 5*

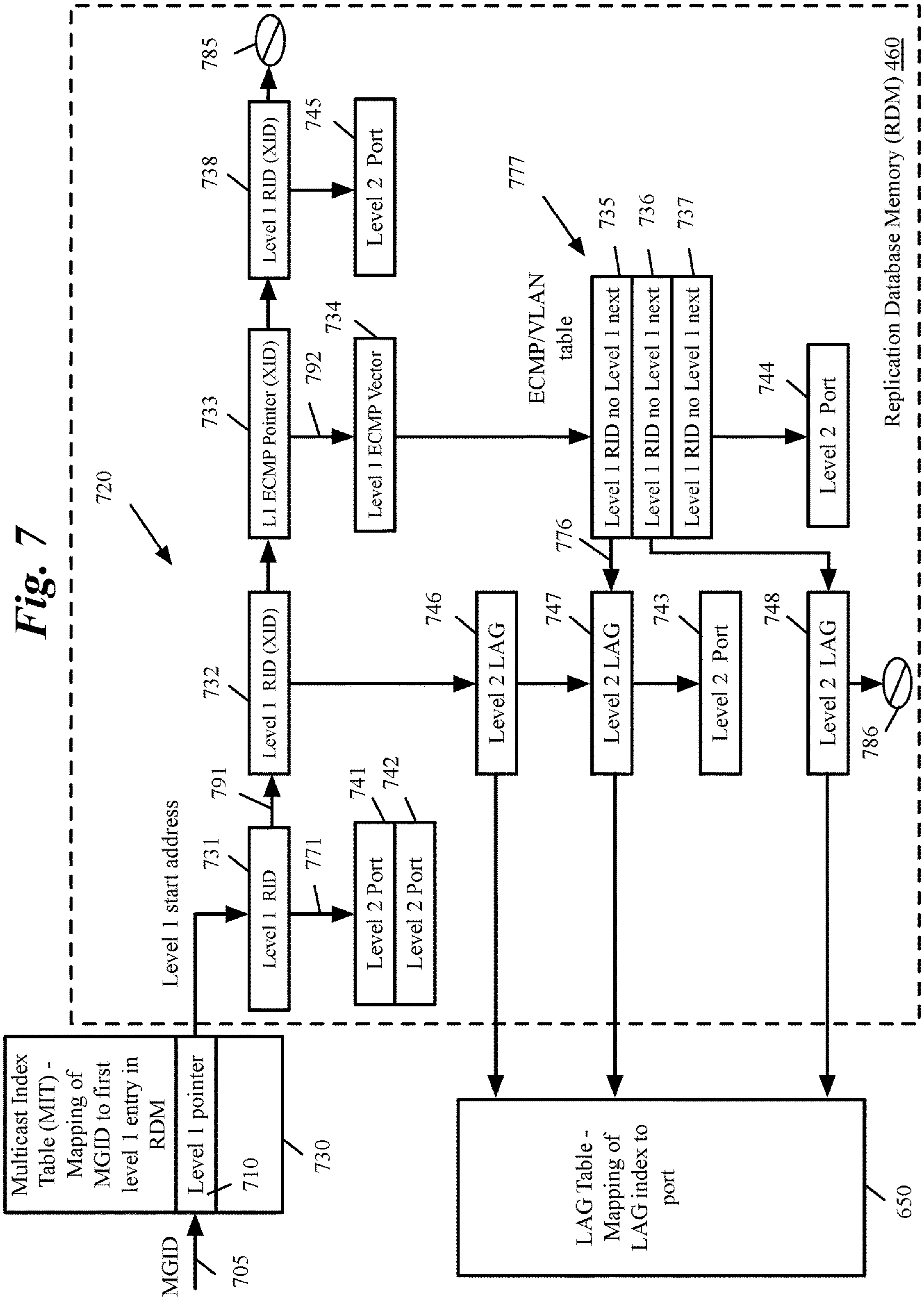

Fig. 7
720
MGID
705
Multicast Index Table (MIT) - Mapping of MGID to first level 1 entry in RDM
Level 1 pointer
710
730
Level 1 start address
Level 1 RID
731
771
Level 2 Port
Level 2 Port
741
742
791
Level 1 RID (XID)
732
L1 ECMP Pointer (XID)
733
792
Level 1 ECMP Vector
734
Level 1 RID (XID)
738
Level 2 Port
745
785
777
ECMP/VLAN table
Level 1 RID no Level 1 next
Level 1 RID no Level 1 next
Level 1 RID no Level 1 next
735
736
737
776
Level 2 Port
744
Level 2 LAG
746
Level 2 LAG
747
Level 2 Port
743
Level 2 LAG
748
786
Replication Database Memory (RDM) 460
LAG Table - Mapping of LAG index to port
650

LINK AGGREGATION GROUP FAILOVER FOR MULTICAST

CLAIM OF BENEFIT TO PRIOR APPLICATIONS

The present Application is a continuation of U.S. patent application Ser. No. 17/346,035, filed Jun. 11, 2021, which is a divisional of U.S. patent application Ser. No. 16/548,833, filed Aug. 22, 2019, now U.S. Pat. No. 11,271,869, which is a continuation of U.S. patent application Ser. No. 15/449,969, filed Mar. 5, 2017, now U.S. Pat. No. 10,404,619. The entire specifications of which are hereby incorporated herein by reference in their entirety.

BACKGROUND

Multicasting is a "one source to many destinations" packet transportation method where a packet is transmitted from a source node to several destination nodes. A network forwarding element such as a router or a switch receives a packet that identifies one or more multicast groups, replicates the packet, and sends the packet copies to the destination nodes that are members of the multicast groups.

The forwarding element identifies an egress path and an egress port to each destination in order to forward a copy of the multicast packet to the destination. Once one of these egress paths or ports fails, the forwarding element has to identify another egress path or port to forward the copy of the multicast packet to the destination.

A typical solution for failover is keeping track of the failed paths and using software in the control plane of the forwarding element to identify an alternative live egress path and/or a live egress port in order to forward the multicast packet. However, utilizing software for failover is slow. Depending on the load of the processor that is executing the software, doing the failover by software may take several milliseconds. Such a delay is not desirable and can cause significant latencies in a high-speed forwarding element.

BRIEF SUMMARY

Some embodiments provide a hardware forwarding element such as a hardware switch or a hardware router with a novel packet-processing pipeline that replicates multicast packets and quickly performs a failover when an egress port or an egress path is identified as failed. The forwarding element performs the failover by doing a set of hardware and firmware operations in the data plane. The forwarding element in some embodiments includes a traffic manager and several ingress and egress pipelines. The traffic manager includes a packet replicator for each egress pipeline.

Each one of the ingress and egress pipelines includes a parser, a match-action unit (MAU), and a deparser. Each ingress pipeline includes several ingress ports and each egress pipeline includes several egress ports. The ports may be physical ports or logical ports. Physical ports are data link layer or open systems interconnection (OSI) Layer 2 (L2) ports. Logical ports are network layer or OSI Layer 3 (L3) ports.

The parser receives the packets coming into the pipeline and produces a packet header vector (PHV) as its output. The PHV provides the input data to match tables of the MAU. The MAU includes a set of match-action stages. Each of these stages matches a particular set of header fields included in the PHV against a match table and takes an action based on the result of the match. The output PHV is then handed to the deparser, which reassembles the packet by putting back together the output PHV and the payload of the packet that the deparser receives directly from the parser.

A multicast packet includes the identification of one or more multicast groups. When a packet is received at an ingress port of an ingress pipeline, the ingress pipeline sends the packet to the traffic manager. The traffic manager includes a packet buffer to store the packets. For each egress pipeline, the traffic manager includes a packet handle generator, a queue admission controller, and a packet replicator. For each packet received at the forwarding element, each packet handle generator creates a packet handle that includes information about the packet. The packet handle also includes the address (e.g., a pointer to) where the packet is stored in the traffic manager packet buffer.

The packet handle generator sends the packet handle to the associated queue admission controller. The queue admission sends the packet handle of the packets that have to be replicated to the associated packet replicator. Packets that need to be replicated include multicast packets and the packets that are flagged by the ingress pipeline for being copied to storage outside the data plane (e.g., to be examined by the forwarding element's processing unit using software).

Some embodiments define a multicast tree for each multicast group. The multicast tree in some embodiments is a two-level tree with several different types of nodes. The nodes at the first level correspond to logical ports or paths. The nodes at the second level correspond to physical nodes. For instance, the nodes in the first level correspond to open system interconnection (OSI) Level 3 (L3) nodes and the nodes in the second level correspond to OSI Level 2 (L2) nodes.

The packet handle that each packet replicator receives includes the identification of one or more multicast groups. The packet replicator scans each multicast tree to identify egress ports for sending a copy of the multicast packet to each multicast group member. For communicating with each multicast member, the packet replicator first identifies a logical port at the first level of the tree and then identifies a corresponding physical egress port at the second level of the tree.

In some embodiments, the forwarding element maintains a status for each logical and physical port. A data structure referred to as port liveness vector is used in some embodiments to identify whether or not a port is operational. Some embodiments utilize a liveness vector for physical ports and a different liveness vector for paths (or the corresponding logical ports). Each port has a corresponding status flag (e.g., a corresponding bit) in the port liveness vector. The value of the flag indicates whether or not the corresponding port is operational. Similarly, each path has a corresponding status flag (e.g., a corresponding bit) in the path liveness vector and the value of the flag indicates whether or not the corresponding path (or logical port) is operational.

After the packet replicator identifies a multicast tree node for communication with a multicast member at each level of the tree, the packet replicator determines whether or not the identified node is operational. A node at the first level of the multicast tree may be associated with an equal cost multi path (ECMP) group or may be associated with a single path. When a node identified at the first level is not operational, the packet replicator uses a resilient hashing method to identify an alternative node. When the identified node is operational, the packet replicator follows a pointer to the second level of the tree to identify a physical egress port to send the multicast packet to the multicast member.

When a node at the second level of the tree is not operational and the node is member of a link aggregation group (LAG), the packet replicator uses resilient hashing to identify an alternative physical port. When the node identified at the second level of the tree is operational, the packet replicator determines whether the identified port is in the same pipeline as the packet replicator.

Each packet replicator makes a copy of the packet header for each valid port. The packet replicator places the identification of the physical port in the packet handle with other information required to generate a replicate copy of the packet. The packet replicator sends the packet handle back to the queue admission controller.

If the physical port is in the same pipeline, the queue admission controller queues the packet handle to the specified port. If the physical port is not in the same pipeline, the queue admission controller drops the packet handle and allows the queue admission controller, which is in the same pipeline as the physical port to queue the packet handle. Since the packet replicators of every pipeline receive the packet handles of every multicast packet and the packet replicates of all pipelines use the same methods and hash values to identify a physical egress ports, the packet handle generated by the packet replicator that is in the same pipeline as the identified physical egress port is used to generate the replicated packet.

The traffic manager then reads the packet handles from each port queue and fetches the packets from the packet buffer starting from the address (or the pointer) given in the packet handle. Packet bytes are then sent to egress pipeline. When all copies of a packet are sent to the corresponding egress pipelines, the packet buffer space is garbage collected as free space. Each replicated copy is then transmitted to the multicast member through the corresponding identified physical port.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 5 conceptually illustrates the information exchanged in a packet handle between the packet replicator and a queue admission controller in some embodiments.

FIG. 7 conceptually illustrates the structure of a multicast table in some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing.

In a forwarding element (e.g., a hardware switch or a hardware router) of some embodiments, the data plane is the part of the architecture that decides what to do with the packets that arrive at the ingress interface. The data plane of a forwarding element in some embodiments is implemented by hardware and firmware while the control plane is implemented in software to provide for a more flexible management of network components from a central location.

Some embodiments provide a hardware forwarding element such as a hardware switch or a hardware router with a novel packet-processing pipeline that replicates multicast packets in the data plane and quickly performs a failover when an egress port or an egress path is identified as failed. The forwarding element performs the failover by doing a set of hardware and firmware operations in the data plane.

I. Hardware-Based Failover for Packet Multicasting

Some embodiments provide a hardware-based fast failover approach for sending multicast messages by a network switch. Each multicast packet includes the identification of one or more multicast groups. A multicast packet is forwarded by the network switch to the destinations that are members of the multicast groups identified in the packet. The network switch uses a multicast tree for each multicast group to identify an egress port to send a multicast packet to each multicast group member.

A. Packet Forwarding Element Architecture

Figure 1:
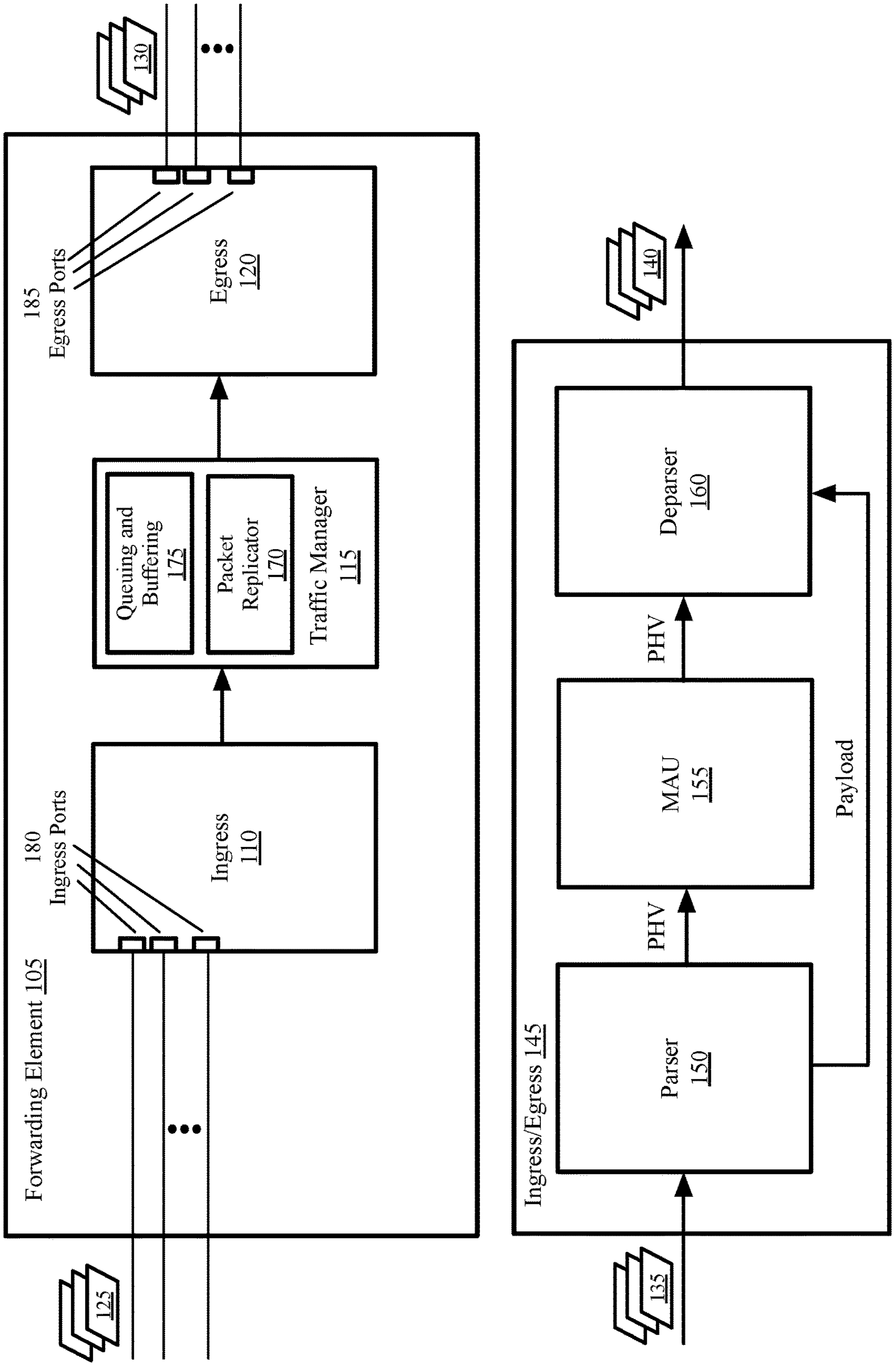
FIG. 1 conceptually illustrates a block diagram of a hardware forwarding element in some embodiments.

FIG. 1 conceptually illustrates a block diagram of a hardware forwarding element in some embodiments. Examples of such a forwarding element include a router or a network switch. As shown, the forwarding element 105 includes an ingress pipeline (or data path) 110, a traffic manager 115, and an egress pipeline 120. The figure also shows a block diagram 145 of an interface of the hardware forwarding element 105.

In some embodiments, the forwarding element 105 includes several ingress and egress pipelines. In these embodiments, each pipeline includes an ingress pipeline 110, a packet replicator 170, and an egress pipeline 120. Each one of the ingress 110 and egress 120 pipelines uses an interface similar to the interface 145. The interface includes a pipeline with three different units, namely a parser unit 150, a match action unit (MAU) 155, and a de-parser unit 160. Each pipeline 145 receives input packets 135 and sends out output packets 140.

The traffic manager 115 has several components such as a queuing and buffering system 175 and a packet replicator 170. The traffic manager 115 in some embodiments receives packets that are processed by the ingress pipeline and provides a large shared buffer (storage) that accommodates the queuing delays due to oversubscription of the output channels of the ingress de-parser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 115 into the egress pipeline 120. The packet replicator 170 in traffic manager implements the multicast function of the network switch. Operations of each packet replicator and other components of the traffic manager are described in detail further below.

As shown, the ingress packets 125 are received at the ingress pipeline 110 through a set of ingress ports 180. The parser 150 of the ingress pipeline in some embodiments receives the incoming packets and produces a packet header vector (PHV) as its output. In other words, the parser 150 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 150 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV produced by the parser provides the input data to the match tables of the MAU. In some embodiments the MAU 155 includes a set of match-action stages (e.g., 32 match-action stages). Each of these stages matches a particular set of header fields of a packet against a match table and takes an action based on the result of the match (e.g., assigning the packet to an output port and queue, dropping the packet, modifying one or more of the header fields, etc.). Based on the actions taken on different header data during the different stages of the MAU 155, the PHV that the MAU outputs to de-parser 160 might include the same header data as the PHV that the MAU received from the parser 150, or the output PHV might contain different data than the input PHV.

The output PHV is handed by the MAU 155 to the de-parser 160. The de-parser 160 reassembles the packet by putting back together the output PHV (that might or might not have been modified) that the de-parser receives from the MAU 155 and the payload of the packet that the de-parser receives directly from the parser 150.

The de-parser then sends the packets 140 out of the ingress/egress pipeline through a set of egress ports 185 (to the traffic manager 115 or out of the forwarding element, depending on whether it is the de-parser for the ingress pipeline or the egress pipeline). An output packet 130 may be the same packet as the corresponding input packet 125 (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 105 are exemplary only. The ingress, traffic manager, and egress blocks are simplified for ease of description. For example, although the figure shows only one entry point to the ingress parser and one exit point from the egress de-parser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 145, some embodiments employ numerous parser blocks (e.g., 16 parser blocks) that feed a match-action unit (MAU) in each pipeline.

The forwarding element (e.g., a switch, router, or combination thereof) of some embodiments uses the OpenFlow protocol. The network packets in some embodiments are routed to, processed by, and routed from the forwarding element according to one or more match-action tables (also referred to as flow tables) that are part of the flow table architecture of the forwarding element. The flow tables include flow entries with (i) match conditions that are compared to the headers of the packets and (ii) actions to take if a packet meets the corresponding match conditions. The flow table architecture includes various memories (e.g., unit SRAMs, TCAMs, etc.) that store the flow table data, as well as arithmetic logic units (e.g., ALUs) and other supporting circuitry.

A multicast packet includes the identification of one or more multicast groups. When a multicast packet is received at an ingress port of an ingress pipeline, the ingress pipeline sends the packet to the traffic manager 115. The traffic manager stores the packet in a buffer and generates a packet handle (PH) for the multicast packet. The packet handle includes information required to duplicate the packet. In some embodiments, the traffic manager sends the packet handle (or a pointer to where the packet handle is stored) to each packet replicator connected to the egress pipelines of the forwarding element.

The packet handle that each packet replicator receives includes the identification of on or more multicast groups. The network switch uses a two level multicast tree for each multicast group to identify an egress port to send the multicast packets to each multicast group member. Each packet replicator scans the multicast tree associated with a multicast group identified in the multicast packet to identify egress ports to send a copy of the multicast packet to each multicast group member. For communicating with each multicast member, the packet replicator first identifies a logical port at the first level of the tree and then identifies a corresponding physical egress port at the second level of the tree.

The packet replicator checks the status of an identified port. If the port is down, the packet replicator identifies an alternative port for forwarding the multicast packet. The packet replicator uses different methods to identify an alternative port depending on whether the failed port is a logical port associated with an ECMP group, a physical port associated with a LAG, or a single physical port not associated with a LAG.

Figure 2:
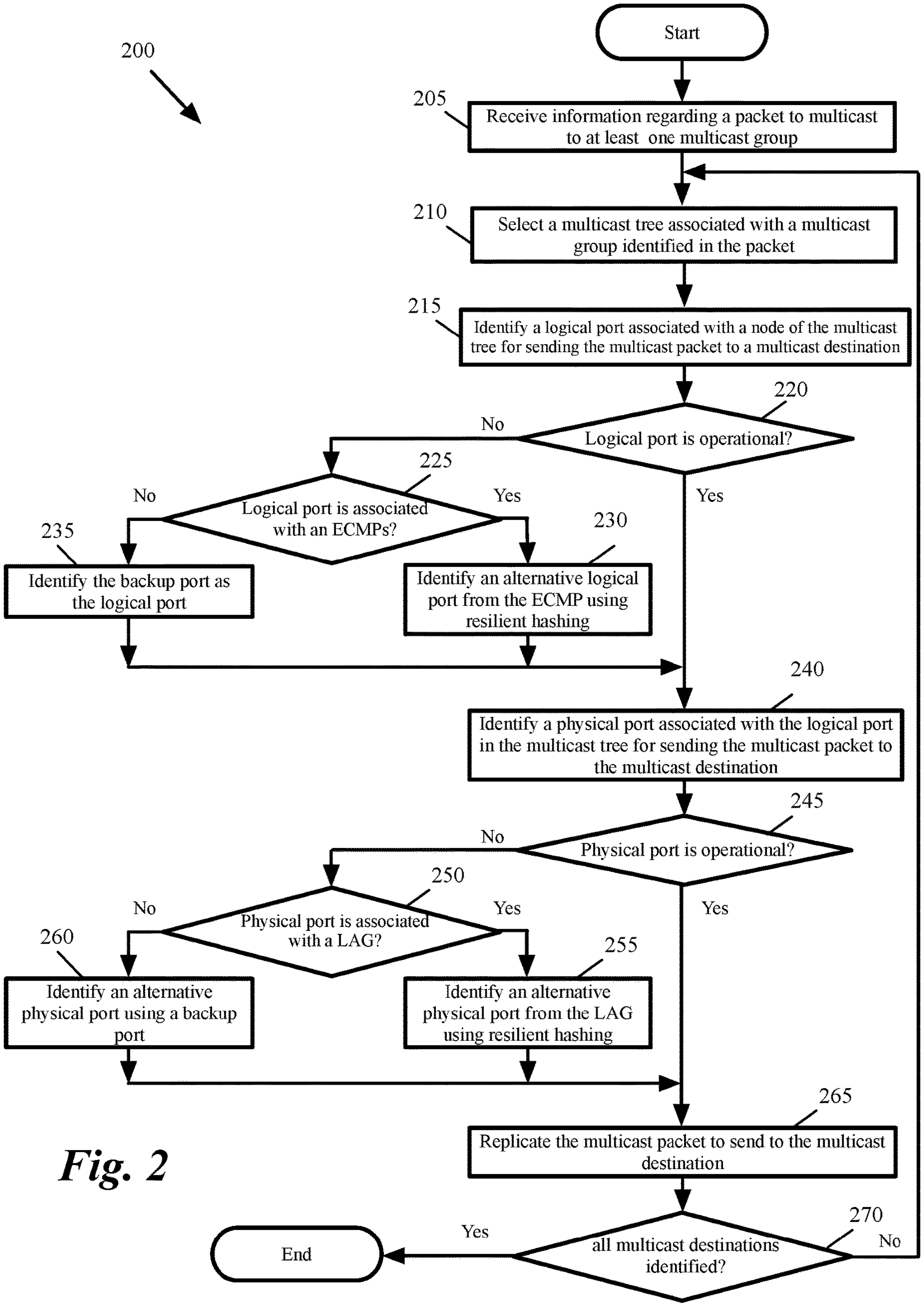
FIG. 2 conceptually illustrates a high-level process for performing multicasting in some embodiments.

FIG. 2 conceptually illustrates a high-level process 200 for performing multicasting in some embodiments. The process in some embodiments is performed by a packet replicator of a forwarding element such as packet replicator 170 in FIG. 1. As shown, the process receives (at 205) information regarding a packet to multicast to at least one multicast group. The information in some embodiments is included in a data structure (referred herein as packet handle). Each multicast packet received at the forwarding element identifies one or more multicast groups. The packet handle includes the identification of the multicast groups specified in the multicast packet. In Internet Protocol (IP) multicast, each multicast packet uses an IP address from a reserved block of IP addresses as the destination IP address. The IP address identifies the multicast group.

Members of a multicast group have to join a multicast group. For instance, in some embodiments each network node sends a request to join a multicast group using a protocol such as Internet Group Membership Protocol (IGMP) to a multicast capable router. Adjacent routers use IGMP to communicate. Each router periodically sends a membership query to verify that at least one network node on each subnet is interested in receiving traffic directed to each multicast group. As described further below, each forwarding element in some embodiments maintains a multicast tree for each multicast group and uses the tree to identify the downstream multicast receivers.

Next, the process selects (at 210) a multicast tree associated with a multicast group identified in the packet handle. In some embodiments, a multicast tree is defined for each multicast group. The multicast tree is a two-level tree. The nodes at the first level correspond to logical ports (or logical paths). The nodes at the second level correspond to physical nodes. Details of the multicast trees used in some embodiments are provided further below. The process then identifies (at 215) a logical port associated with a node of the multicast tree for sending the multicast packet to a multicast destination.

Figure 3A:
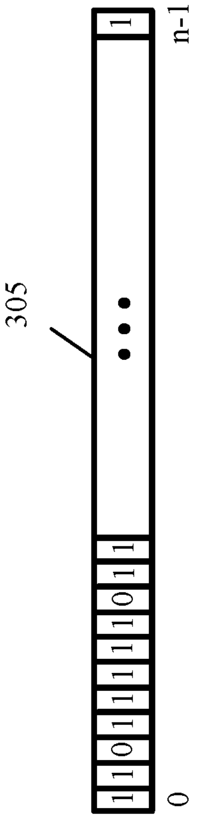
FIG. 3A conceptually illustrates a logical view of a data structure that shows the status of egress links of a forwarding element to each next hop in some embodiments.

The process then determines (220) whether the identified logical port is operational. Some embodiments maintain a status for the configured links between the forwarding element and the next hops in the network. For instance, when a path is no longer operational, the status of the path is changed to "failed". If the path becomes operational at a later time, the status is changed back to "operational". FIG. 3A conceptually illustrates a logical view of a data structure (e.g., a vector referred to as liveness vector) that shows the status of egress links of a forwarding element to each next hop in some embodiments. Each link is associated with a logical port (e.g., an L3 port).

As shown, vector 305 is an array of n bits. Each bit corresponds to a configured egress link (i.e., a logical port or a path) of the forwarding element to a next hop. The status of each link is represented by the value of the corresponding bit. When a link is up and operational, the corresponding bit is set to on (e.g., is set to 1) to indicate that the link is live. On the other hand, when a link is down, the corresponding bit is set to off (e.g., is set to 0) to indicate that the link has failed and is not available.

Figure 3B:
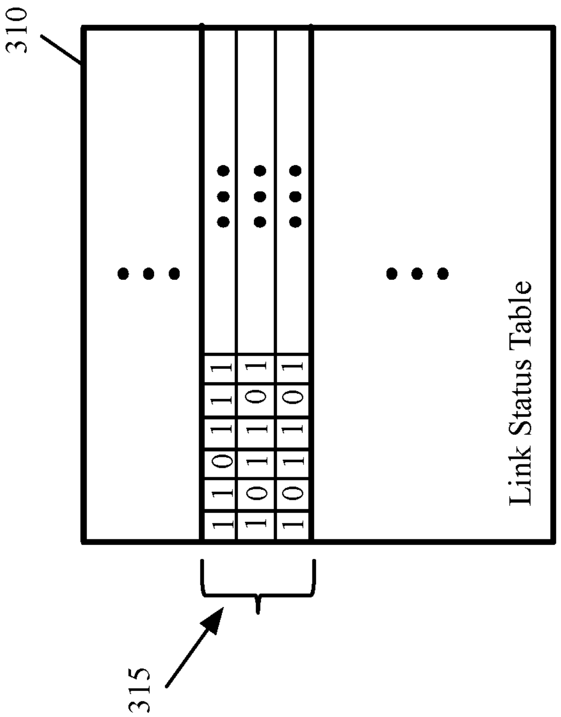
FIG. 3B conceptually illustrates an implementation of the logical vector of FIG. 3A.

Vector 305 in some embodiments is stored in memory as a group of one or more words. FIG. 3B conceptually illustrates an implementation of the logical vector 305 of FIG. 3A. As shown, some embodiments utilize a link status table 310 in an area of memory (referred to herein as the live link vector table) for storing the status of the links. The memory used to store table 310 in some embodiments is a dual port memory that is capable of being read and written by hardware. The dual port memory is also capable of being written by software. In contrast, a random access memory (RAM) is read by hardware but is written only by software. For instance the software writes into a buffer, which is in turn transferred into the RAM. As described further below, a similar logical structure as structure 305 and a similar data structure as data structure 310 are used to show the status of each physical egress port.

In some embodiments, the forwarding element uses bidirectional forwarding detection (BFD) signals to determine whether a path between the forwarding element and a network destination is operational. The forwarding element sends BFD transmit packets to a network destination over each configured path. When BFD response packets are not received over a path in response to a predetermined number of BFD transmit packets, the forwarding element marks the path as failed. The hardware forwarding element changes the value of the bit in data structure 310 corresponding to the failed path to "failed" (e.g. to 0). The hardware sends and receives the BFD packets and changes the status in the data plane of the forwarding element using the match-action stages in the ingress pipeline of the forwarding element without using software.

In some embodiments, the forwarding element includes one or more monitoring units that monitor the physical egress ports. When a physical egress port fails, one of the monitoring units generates a hardware signal that identifies the physical egress port as a failed port. The traffic manager receives the hardware signal and generates a feedback to one of the ingress pipelines. The ingress pipeline then changes (e.g., by using the match-action units in the ingress pipeline) the value of the bit in data structure 310 corresponding to the failed port to "failed" (e.g. to 0). The hardware forwarding element changes the status in the data plane of the forwarding element using the match-action stages in the ingress pipeline of the forwarding element without using software.

Referring back to FIG. 2, the process uses the data structure 310 in FIG. 3B to determine (220) whether the identified logical port is operational. If yes, the process proceeds to 240, which is described below. Otherwise, the process determines (at 225) whether the logical port (and the logical port's associated link) is associated with an ECMP. In a network topology there are often multiple paths to deliver a packet from one hop to the next. One technique to forward packet to the next hop is ECMP. When there are multiple best cost paths to the next hop, a router using ECMP can increase bandwidth by load balancing network traffic over multiple paths. If the port (and its associated path) belongs to an ECMP, the process identifies (at 230) an alternative logical port from the ECMP using resilient hashing. The process then proceeds to 240, which is described below.

Each packet (including multicast packets) has a set of fields (e.g., an n tuple in the packet header) that uniquely identifies the packet's flow. For instance, the n tuple may include the OSI L3 source and destination addresses (e.g., source Internet protocol (IP) and destination IP addresses), the OSI Layer 4 (L4) source and destination ports (e.g., transmission control protocol (TCP) or user datagram protocol (UDP) source and destination ports), and the L4 protocol used (e.g., TCP or UDP). A hash of the n tuple of each packet is used to identify an egress port for the packet.

Some embodiments use resilient hashing to ensure that only the flows that were sent through the failed egress port are diverted to an alternative port without redistributing the flows that were sent through the operational ports. Resilient hashing is used for selecting an alternative logical port for a failed logical port that is part of an ECMP group. Resilient hashing is also used for selecting an alternative physical port for a failed physical port that is part of LAG. Details of resilient hashing are provided further below.

In some embodiments, each logical port that is not in an ECMP is associated with a backup port. If the failed logical port is not associated with an ECMP, the process identifies (at 235) the backup port associated with the failed port as the logical port for multicasting. The process then identifies (at 240) a physical port associated with the identified logical port in the multicast tree for sending the multicast packet to the multicast destination.

The process then determines (at 245) whether the physical port is operational. Some embodiments maintain a status for each physical port of the forwarding element. For instance, when a port is no longer operational, the status of the path is changed to "failed". If the port becomes operational at a later time, the status is changed back to "operational". Some embodiments utilize a data structure similar to data structure 310 in FIG. 3B (with a logical view as data structure 305 in FIG. 3A) to maintain the status of the physical egress ports. The process uses this data structure to determine whether or not a physical port is operational.

When the physical port is operations, the process proceeds to 265, which is described below. Otherwise, the process determines (at 250) whether the physical port is associated with a LAG. A LAG groups several physical ports together (as one logical port) to increase throughput and create redundancy. If the physical port is part of a LAG, the process identifies (at 255) an alternative physical port from the LAG using resilient hashing. The process then proceeds to 265, which is described below. In some embodiments, each physical port that is not in a LAG is associated with a backup port. If the failed physical port is not in a LAG, the process identifies (at 260) the backup port associated with the failed port as the physical port for multicasting.

The process then replicates (at 265) the multicast packet to send to the multicast destination. The process then determines (at 270) whether all multicast destinations are identified. If not, the process proceeds to 210 to identify a physical egress port to send the multicast packet to the next multicast destination. Otherwise the process ends. When the multicast packet identifies several multicast groups, process 200 is repeated for each multicast group identified in the packet.

B. Resilient Hashing

Some embodiments redistribute the packet flows from the failed paths or failed ports without redistributing packet flows that were going through the operational paths or ports. The packets of the same flow are forwarded to the same operational links or ports. Some embodiments provide a resilient hashing technique for forwarding packets. A packet flow is a sequence of packets from a source to a destination within a certain time period. A set of fields of each packet uniquely identifies the corresponding packet flow. For instance, a set of packet fields (or n tuple) such as the L3 source and destination addresses (e.g., source IP and destination IP addresses), the L4 source and destination ports (e.g., TCP or UDP source and destination ports), and the L4 protocol used (e.g., TCP or UDP) may identify a packet flow in some embodiments.

In some embodiments, the forwarding element can forward a packet to its destination through one of several egress paths or several egress ports (e.g., through one or many paths in an ECMP or one of many egress ports in a LAG). It is desirable to forward the packets of the same flow through the same path (or port) as long as that path (or port) is up in order to achieve one or more goals such as traffic shaping, quality of service, fair queuing, etc. The set of fields that uniquely identifies the packet flow in each packet is hashed using several (e.g., 2, 4, 16, or generally n) different hash functions. All n different hash values in some embodiments are calculated simultaneously using hardware. The hash value modulo the number of configured paths in ECMP (or the number of physical ports in the LAG) is computed.

Each packet flow is assigned to one of the egress paths (or egress ports) based on the first calculated modulo value. When an egress path (or port) fails, an alternative path (or port) is selected for the flow whose path (or port) has failed using the second calculated modulo value. The flows through the operational paths (or ports) are still forwarded using the first calculated modulo value. The resilient hashing technique, therefore, only redistributes packet flows that were assigned to the failed path (or port) without redistributing packet flows that were previously assigned to the operational paths (or ports).

If resilient hashing fails to identify an operational path (or port) after using all n calculated modulo values, some embodiments utilize a deterministic method to identify a path (or port) for redistributing the flows from a failed path (or port). Once such a path (or port) is identified, the path (or port) is used to forward packets of the same flow. Similar to the resilient hashing technique, the deterministic method only redistributes packet flows that were assigned to the failed paths (or port) without redistributing packet flows that were previously assigned to the operational paths (or ports).

For instance, some embodiments use a set of ordered bits (such as data structure 305 in FIG. 3) that shows the operational status of each defined path to a next hop (or each physical egress port). The bits are then deterministically scrambled according to a first computation performed on a set of packet fields. For instance, a first hash value using a first hash function is computed on a set of fields on the packet header. The set of fields in some embodiments is an n tuple (as described above) that uniquely identifies a packet flow.

The hash value is used by a scrambler to scramble the set of status bits. A start position in the set of scrambled status bits is then selected according to a second computation based on the set of packet fields. For instance, a second hash function is used to compute a second hash value from the n tuple in the packet header. The second hash function in some embodiments utilizes a different hash algorithm than the first hash function. The hash value computed by the second hash function is used as an index (or pointer) to identify one of the scrambled status bits as a start position to identify an operational path (or port).

The scrambled bits are then traversed from the selected start position to identify the first active path (or port) that is encountered during the traverse (i.e., the first path or port with a status bit indicating that the path or port is operational). The identified path (or port) is then used for forwarding the packet.

C. Packet Replicator

The packet replicator in some embodiments is used to implement the multicast function. The traffic manager includes one packet replicator for each egress pipeline. Each packet replicator can receive one or more packet handles (PHs) per clock and generate packet handles for each multicast packet using the information in the received PH. The packet replicator is used to generate packet handles used to replicate multicast packets. Packet replicator is also used in some embodiments to generate a packet handle for making a copy of a packet for use by a processing unit outside the data path of the forwarding element.

Figure 4:
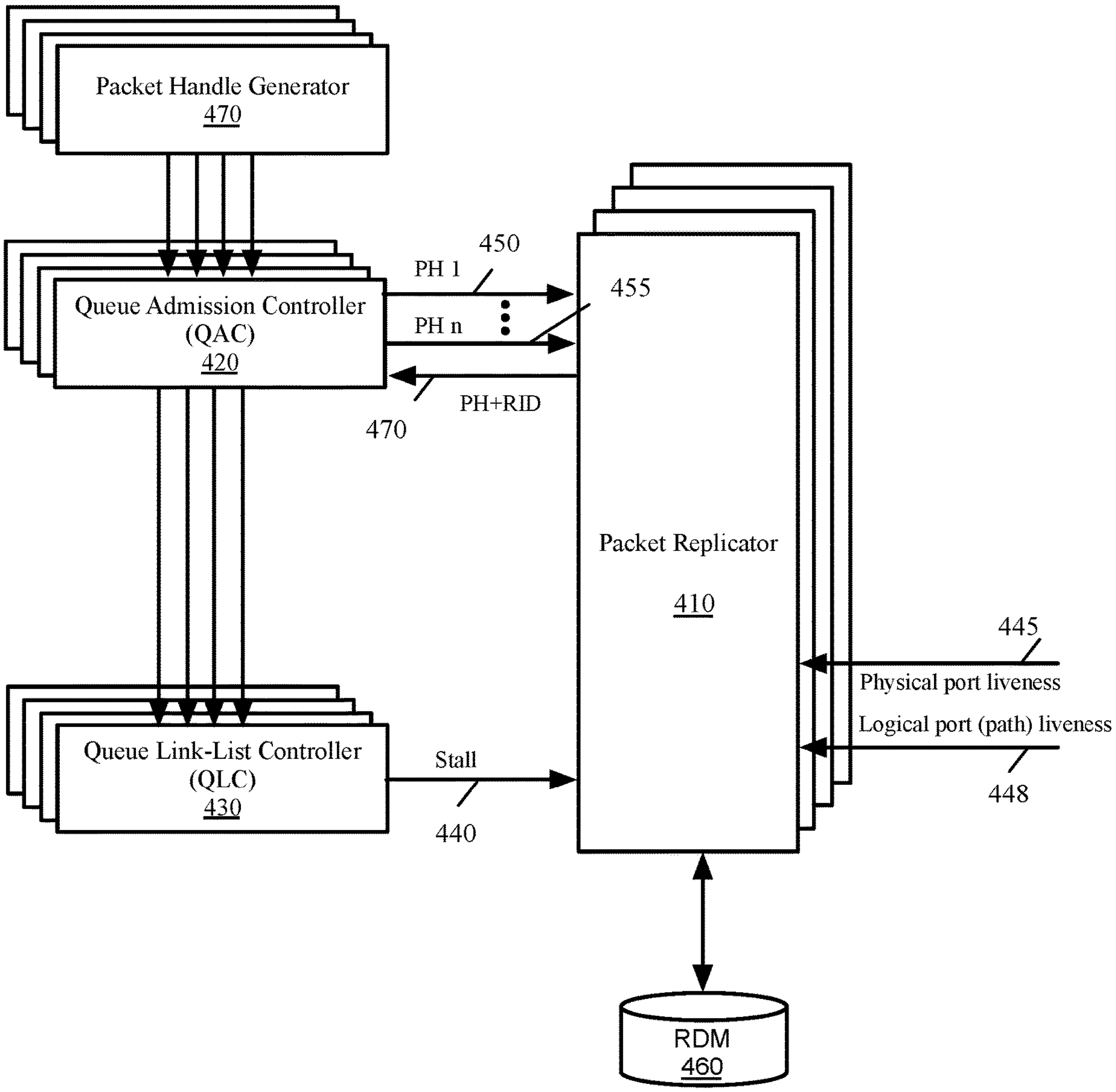
FIG. 4 conceptually illustrates a portion of the traffic manager of a forwarding element in some embodiments.

FIG. 4 conceptually illustrates a portion of the traffic manager of a forwarding element in some embodiments. As shown, the traffic manager includes several packet handle generators (470), several queue admission controller (QAC) 420, several queue link-list controller (QLC) 430, several packet replicator 410, and a replication database memory (RDM) 460. The traffic manager in some embodiments has one packet handle generator (470), one queue admission controller (QAC) 420, one queue link-list controller (QLC) 430, and one packet replicator 410 per pipeline.

The queue admission controller (QAC) 470 in each pipeline generates a packet handle for each packet received at the traffic manager. The queue admission controller (QAC) 470 passes packet handles to the QAC 470. When the packet handle indicates that the packet is a multicast packet and/or the packet has to be copied outside the data plane for access by the forwarding element processor, the QAC passes the packet handle to the packet replicator. As shown, each packet replicator 410 receives several PHs 450-455 from a corresponding queue admission controller (QAC) 420.

A packet handle is a data structure that includes information about a packet. The packet handles exchanged between the packet replicator and QAC include information used by the packet replicator to replicate the packet handle for sending the multicast packet to each multicast destination and/or for coping the packet outside the data plane for access by the processor.

FIG. 5 conceptually illustrates the information exchanged in a packet handle between the packet replicator and a QAC in some embodiments. The figure shows the names 590 of several parameters 505-585 exchanged between the packet replicator and the QAC. The figure also shows the direction 595 of the information from the packet replicator viewpoint. As shown, the parameters exchanged between the packet replicator and QAC include the ingress port 505 where the multicast packet is received and the packet replicator first in first out (FIFO) identification 510.

The parameters received at the packet replicator include two hash values 515-520. The hash values are calculated on an n tuple of the multicast packet using two different hash functions. The n tuple includes several packet header fields that uniquely identify the packet's flow. For instance, the n tuple may include the L3 source and destination addresses (e.g., source IP and destination IP addresses), the L4 source and destination ports (e.g., TCP or UDP source and destination ports), and the L4 protocol used (e.g., TCP or UDP). A hash of the n tuple of each packet modulo the number of configured paths (or ports) is used to identify an egress path (or port) for the packet.

Hash 1 515 is used to perform hashing for the nodes at the first level of the multicast tree. Hash 2 520 is used to perform hashing for the nodes at the second level of the multicast tree. Although only two hash values are shown, some embodiments utilize more than two hash values (e.g., n hash values). In these embodiments, the PH includes n hash values. The received parameters also include identification (e.g., 530 and 540) for one or more multicast groups. Each multicast group identification is associated with a valid flag (e.g., 525 and 535), which indicates whether the multicast group identification field includes a valid multicast identification.

The parameters received at the packet replicator also include a flag 545 to indicate whether the packet should be replicated outside the data plane for access by a processing unit of the forwarding element. The parameters also include an ingress level 1 exclusion identification (XID) 550, which is an identification associated with a level 1 subtree of the multicast tree. The XID is used for multicast pruning. When the ingress XID matches an XID associated with a level 1 node of the multicast tree, the entire level 1 subtree is skipped for replication.

The received parameters also include a level 2 exclusion identification (YID) 555. The YID is an identification that is used as an index into a pruning mask table (PMT). The PMT entry pointed by the ingress YID is used as the prune port mask. The prune port mask is only applied to the level 2 port vector (described further below) if the ingress replication identification (RID) 560 matches a user specified global RID or the level 1 node RID. Replication is not performed for the ports that are masked out.

The parameters sent from the packet replicator to the QAC include an egress RID 565. A packet may need to be copied to the same physical egress port because there may be several multicast groups sharing the same physical port. The egress RID is associated (as shown by 470 in FIG. 4) with each copy of the PH in order to distinguish different copies or instances of a multicast packet. Every copy of the PH passed back to the QAC is accompanied by a tuple {RID, physical port}. This tuple is sufficient to uniquely identify each instance.

The parameters sent to the QAC also include a flag 570 to indicate whether the packet handle is the first packet handle, a flag 575 to indicate whether the packet handle is the last packet handle, a flag 580 to indicate whether to drop the packet. The parameters sent from the packet replicator to the QAC also include the identification 585 of a physical egress port for sending a copy of the multicast packet to the multicast group member.

Referring back to FIG. 4, every multicast group identification is associated with a multicast tree that is stored in the RDM 460. Each tree has two levels: level one represents logical ports (or port groups) and level two represents the set of physical ports within each logical port group. The packet replicator in some embodiments responds to a stall signal 440, which is asserted by QLC 430. On receiving a stall signal 440, the packet replicator suspends operation until the stall signal is de-asserted. The packet replicator also receives a physical port liveness vector 445 and a logical port (or path) liveness vector 448, which are data structures similar to data structure 310 in FIG. 3B that indicate the status of each physical egress port or logical egress port (or egress path).

Figure 6:
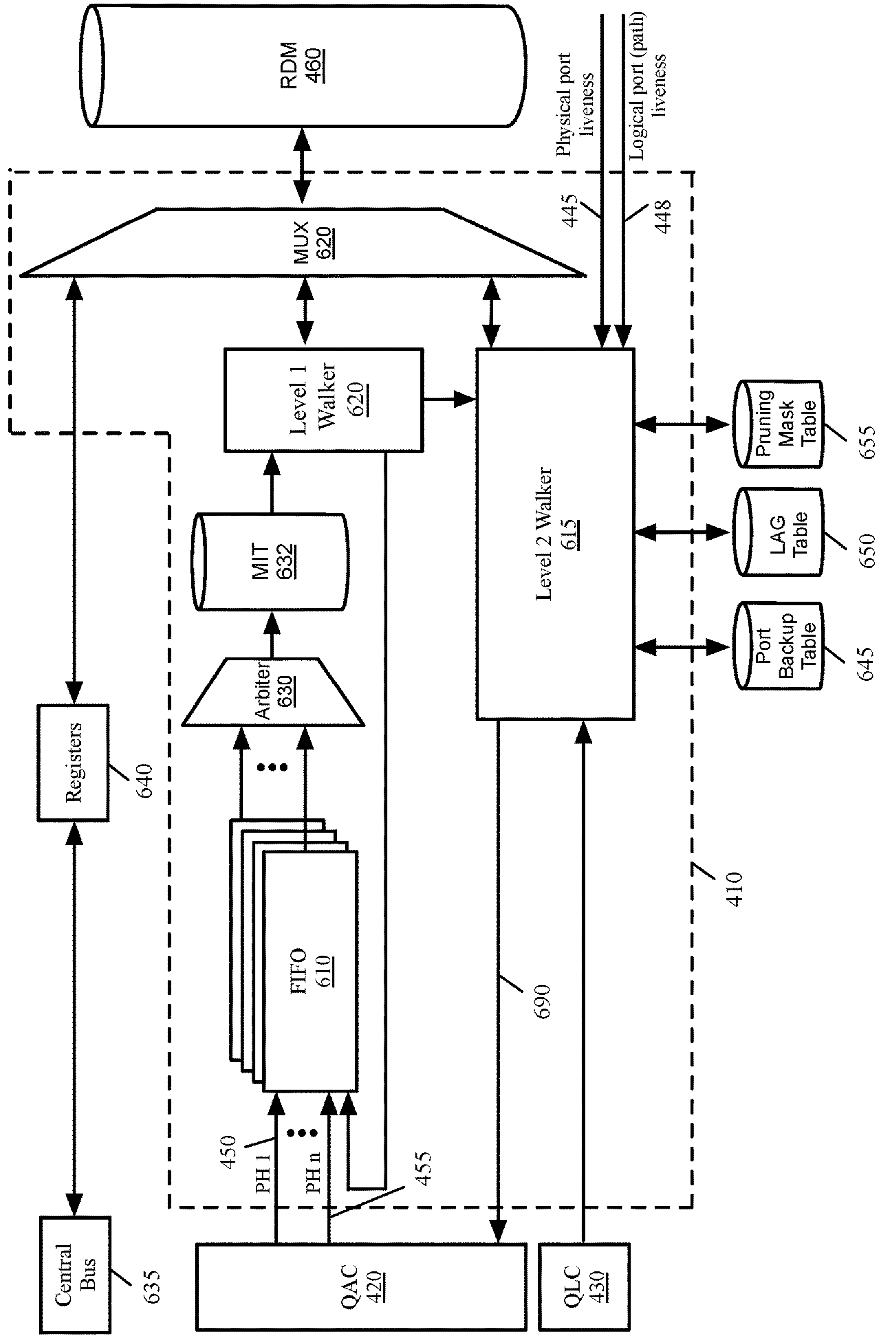
FIG. 6 conceptually illustrates data flows of a packet replicator in some embodiments.

FIG. 6 conceptually illustrates data flows of a packet replicator 410 in some embodiments. As shown, the packet replicator includes a FIFO 610, an arbiter 630, a multiplexer 620, a level 1 walker 620, and a level 2 walker 615. Each multicast group has a corresponding multicast tree stored in RDM 460. The packet replicator also includes (or have access to) a multicast index table (MIT) 632.

Each multicast tree has two levels (level 1 and level 2). Level 1 identifies logical ports and logical port groups (such as ECMPs/VLANs). Level 2 identifies the physical ports and physical port groups (such as LAGs). Level 1 walker 620 processes the first level of the multicast tree and level 2 walker 615 processes the second level of the multicast tree. Multicast pruning is performed at level 1 and level 2 to ensure multicast packets are only sent to multicast group members and each member does not receive duplicate packets.

Upon receipt of a PH 450-455, the packet replicator 410 stores the PH in a FIFO 610 reserved for the priority of the corresponding packet. For instance, if the packet replicator can receive 4 PHs per clock, the packet replicator includes 4 FIFOs 610 with priorities from 0-3. The packet replicator then processes all non-empty FIFOs according to a strict priority or a weighted round robin combination scheme. In order to maximize fairness, the packet replicator does not necessarily process the entire multicast tree at one time. Rather, the packet replicator generates some number of packet copies and then saves the current state at the back of the appropriate FIFO. To avoid packet re-ordering issues, the packet replicator always processes the same number of level 1 lookups at each 'time slice'.

After selecting a new PH to process, the packet replicator determines the location of the start of the multicast tree for that packet. The packet replicator then walks the tree, and makes a copy of the PH for each valid physical egress port. Each copy instance is uniquely identified by an RID and the associated physical egress port.

The packet replicator then passes each new PH back to the QAC 420 together with the egress port and a set of flags indicating whether this is the first, the last, or an intermediate copy. If there are no copies, then a drop signal (e.g., the drop flag 580 in FIG. 5) is provided to the QAC. Details of the parameters exchanged between the packet replicator and the QAC was described above by reference to FIG. 5.

The arbiter 630 chooses the next FIFO to serve. Upon receiving a PH from the arbiter 630, the packet replicator maps the first valid multicast group identifier to the address of the root level node of the multicast tree for this group by looking up the level 1 in the MIT 632. Level 1 walker 620 then walks the table in the RDM 460 to find the level 1 nodes, and level 2 walker walks the table in the RDM to find the physical ports.

For each physical port found, level 2 walker 615 verifies that the port is not masked out by a prune port mask. If the port is not masked, level 2 walker copies the original PH, adds the new information for this instance, and passes the PH (as shown by 690) to the QAC 420.

Each PH includes a "copy for CPU valid flag" bit (as shown by 545 in FIG. 5). If the "copy for CPU valid flag" bit is set, the level 2 walker makes a copy that is sent to a CPU port (as specified in a configuration register 640, which can be programmed through the central bus 635). The level 2 walker can choose one entry from a LAG that can span the entire forwarding element. Level 2 walker 615 provides resilient hashing using physical port liveness information 445. Level 2 walker selects backup ports for single egress ports from port backup table 645. LAG table 650 provides information about LAG ports. Pruning mask table 655 provides pruning mask information physical ports to level 2 walker 615.

Once the level 1 walker 620 has made the maximum number of copies per 'time slice' then the level 1 walker pushes the PH to the end of the FIFO together with a copy of the internal state. The PH is also pushed back to the FIFO between processing different multicast groups, in order to minimize the state that must be saved with each PH.

FIG. 7 conceptually illustrates the structure of a multicast tree in some embodiments. The RDM 460 stores a tree of logical and physical ports for every multicast group identification. The figure shows an example of the abstract view of a multicast tree 720. The multicast tee 720 has two levels to reflect the concept of ports. Level 1 nodes are 731-738 and level 2 nodes are 741-748. The multicast tree is examined by level 1 walker 620 and level 2 walker 615 shown in FIG. 6. Level 1 nodes are processed by level 1 walker and level 2 nodes are processed by level 2 walker. The two walkers interact and exchange information and state with each other. For simplicity, the following discussions refer to the two walkers collectively as "the walker".

The multicast tree in some embodiments includes several different type of nodes: (i) level 1 RID node, (ii) level 1 RID with XID node, (iii) level 1 RID with no level 1 next node, (iv) level 1 ECMP pointer with XID node, (v) level 1 ECMP pointer node, (vi) level 1 ECMP vector node, (vii) level 2 port node, and (viii) level 2 LAG node.

At level 1 of multicast tree 720, a port is a logical port such as an ECMP port group. At level 2, a port is a physical port 741-745 or a group of physical ports in a LAG 746-748. The physical port refers to a physical port attached to the local pipeline. Each pipeline processes its own copy of each multicast packet.

Figure 8A:
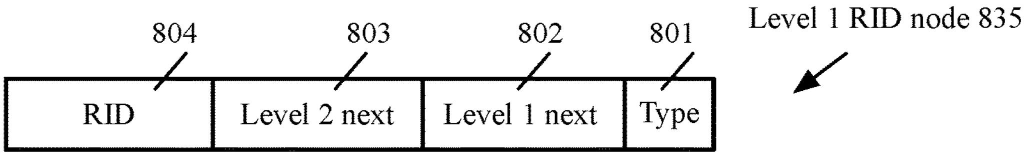
FIGS. 8A-8F conceptually illustrate the format of level 1 nodes of a multicast tree in some embodiments.

FIGS. 8A-8F conceptually illustrate the format of level 1 nodes of a multicast tree in some embodiments. As shown in FIG. 8A, a level 1 RID node 835 includes a type 801, a level 1 next pointer 802, a level 2 next pointer 803, and an RID 804. The type field 801 is used in both level 1 and level 2 nodes and includes several sub-fields. One sub-field is used to indicate whether the node is a level 1 or level 2 node. Another sub-field is used to indicate whether the node is part of an ECMP/VLAN (if a level 1 node), part of a LAG (if a level 2 node), a single node. Other sub-fields are used to indicate whether the node is a level 1 RID node, a level 1 RID with XID node, a level 1 RID with no level 1 next node, a level 1 ECMP pointer with XID node, a level 1 ECMP pointer node, a ECMP vector node, a level 2 port node, or a level 2 LAG node.

A level 1 next pointer 802 is a pointer (such as pointer 791 of node 731 in FIG. 7) to the next level 1 node. A level 2 next pointer 803 is a pointer (such as pointer 771 of node 731 in FIG. 7) to the next level 2 node. An RID 804 is the replication identifier of the node. A level 1 RID Node (such as nodes 805 and 731) specifies the RID that should be used for all level 2 ports on the attached level 2 chain (which, for level 1 node 731, starts at node 741 pointed by the "level 2 next" pointer 771). Once the level 2 chain has been processed, the packet replicator resumes at the node 732 pointed by "level 1 next pointer" 791.

Figure 8B:
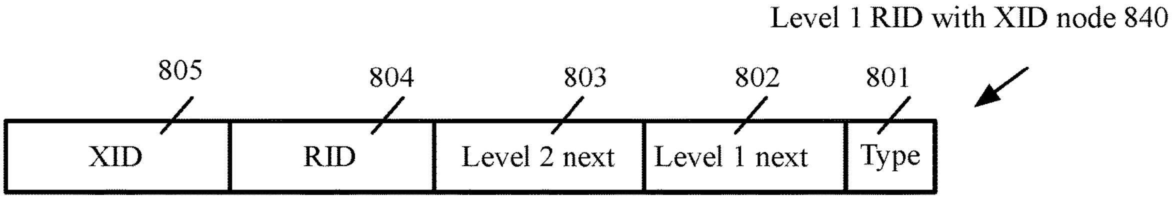

As shown in FIG. 8B, a level 1 RID with XID node 840 includes an XID 805 in addition to the fields described for a level 1 RID node 805. An XID is an identification associated with a level 1 subtree for multicast pruning. A level 1 RID with XID node is processed similar to a level 1 RID node. However, when an XID in a PH matches a level 1 node XID, the entire level 1 RID tree is skipped for replication.

Figure 8C:
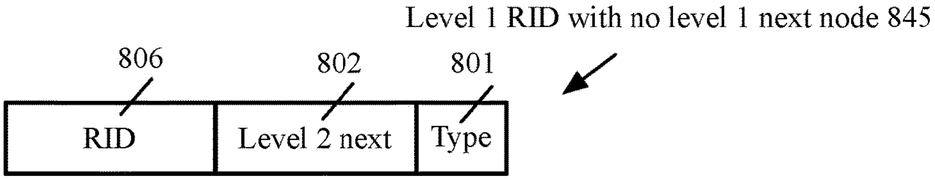

As shown in FIG. 8C, a level 1 RID Node with no level 1 next pointer 845 specifies the RID 806 that should be used for all level 2 ports on the attached level 2 chain. For instance, for node 735 all level 2 ports for the node start at the node pointed by the level 2 next pointer 776. There is no level 1 next pointer so the level 1 chain ends at a node such as node 735.

Figure 8D:
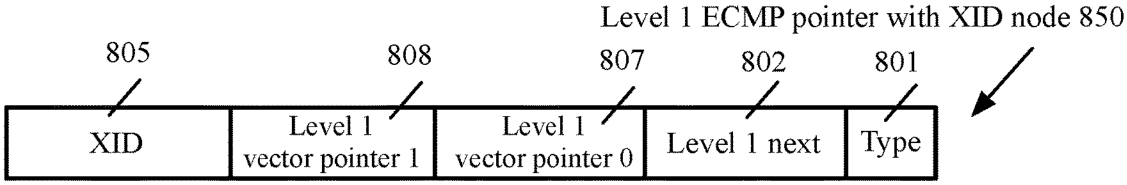
Figure 8E:
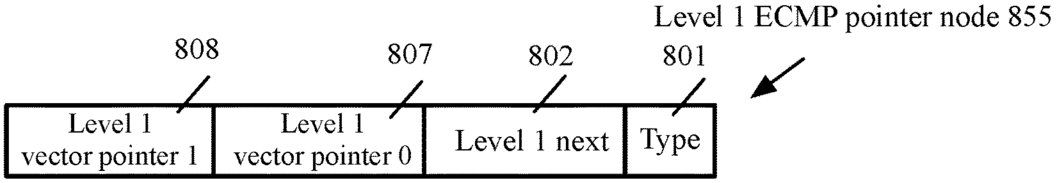

As shown in FIG. 8D, a level 1 ECMP pointer with XID node 850 points to a level 1 ECMP vector node in the RDM (e.g., node 733 in FIG. 7 points to node 734). The level 1 tree is skipped for replication if the ingress PH XID matches the node XID. The node 850 also has several level 1 vector pointers 807-808 to point to level 1 ECMP vector nodes. For instance, level 1 ECMP pointer with XID node 733 in FIG. 7 has a level 1 vector pointer 792 to level 1 ECMP vector node 734. As shown in FIG. 8E, a level 1 ECMP pointer node 855 is similar to a level 1 ECMP pointer with XID node 850, except the level 1 ECMP pointer node does not include an XID.

Figure 8F:
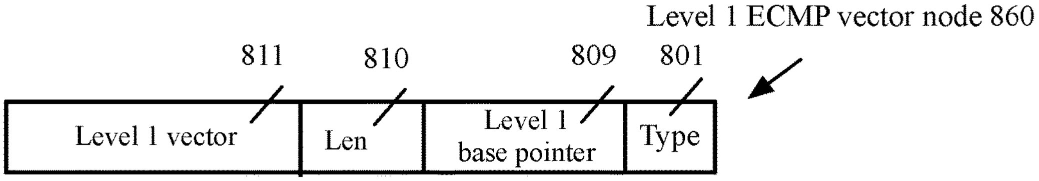

As shown in FIG. 8F, a level 1 ECMP vector node 860 is used to select one "level 1 RID without level 1 node" from a set of possible nodes. For instance, node 734 is used to select one of nodes 735-737 in FIG. 7. The figure shows an example of an ECMP table 777 that includes three "level 1 RID without a level 1 next" nodes 735-737. Each RID node 735-737 corresponds to one level 1 chain. The walker chooses one of the three nodes to follow. As shown in FIG. 8F, node 860 includes a level 1 base pointer 809 (to point to the ECMP table), the length 810 of the level 1 vector, and a level 1 vector 811 (a bit vector of valid level 1 nodes).

Figure 9A:
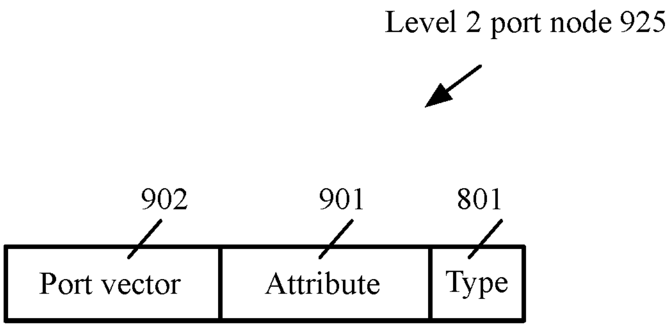
FIGS. 9A-9B conceptually illustrate the format of level 2 nodes of a multicast tree in some embodiments.
Figure 9B:
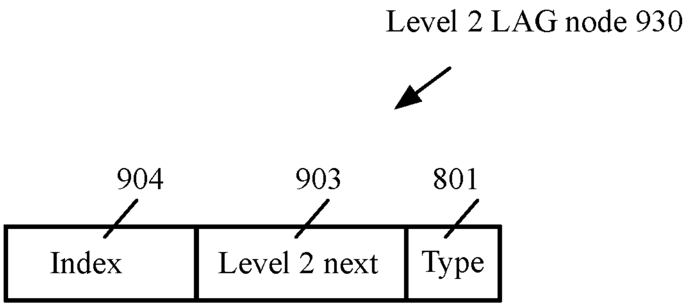

FIGS. 9A-9B conceptually illustrate the format of level 2 nodes of a multicast tree in some embodiments. As shown in FIG. 9A, a level 2 port node 925 includes a physical port vector 902 which has one bit for each physical port attached to the pipeline to which packet is multicast. The attribute field 901 includes the pipeline number and a flag to indicate whether the node is the last level 2 port node of the level 1 tree.

A level 2 LAG node (such as node 746) is used to select one physical port from a group of several physical ports. As shown in FIG. 9B, a level 2 LAG node 930 includes a level 2 next pointer 903, which is the address of the next level 2 node. A value of 0 indicates the end of the level 2 chain (e.g., as shown by 786 in FIG. 7). Node 930 also includes an index 904 into a LAG table (such as LAG table 650 in FIG. 7).

Each PH in some embodiments includes multiple multicast group identifications (MGIDs). Each MGID is processed independently. For each MGID, the walker starts by using the MGID 705 as an index 710 into the MIT table 730. The index maps the MGID to the address of the root level 1 node 731 of the multicast tree 720 corresponding to the MGID 705.

The walker then reads the first level 1 node 731 from the address 710 from the RDM. Each level 1 node may have a pointer to a level 2 node and/or another level 1 node. For instance, level 1 node 731 has a pointer to level 1 node 732 and a pointer to level 2 node 741. When there is a level 2 pointer, the walker preserves the next level 1 pointer (if any) and follows the level 2 pointer. The walker processes the level 2 chain until there are no more level 2 nodes on the chain, at which point the walker fetches the next level 1 node (from the saved pointer) and repeats the process.

As shown by 785 and 786, the end of each level 1 chain is identified by a null pointer (e.g., a pointer with a value of 0). Level 2 LAG nodes 746-748 have an index into the LAG table 650. Lag table 650 maps the LAG index into a physical port. The RDM 460 includes several physical blocks of memory. Each block is statically assigned to one pipeline at a time (and hence one packet replicator). The assignment is made by the forwarding element's processing unit (CPU). Within a tress associated with a MGID, all level 1 RIDs are unique.

D. ECMP/VLAN Logical Port Selection

When a packet replicator walker selects a level 1 node of a multicast tree (e.g., a level 1 node of multicast tree 720 in FIG. 7), the walker checks the status of the ECMP path (e.g., by checking the status bit corresponding to the selected path in a data structure such as data structure 310 in FIG. 3B) to determine whether the path is operational. If the path is not operational, the walker selects an alternative path.

Figure 10:
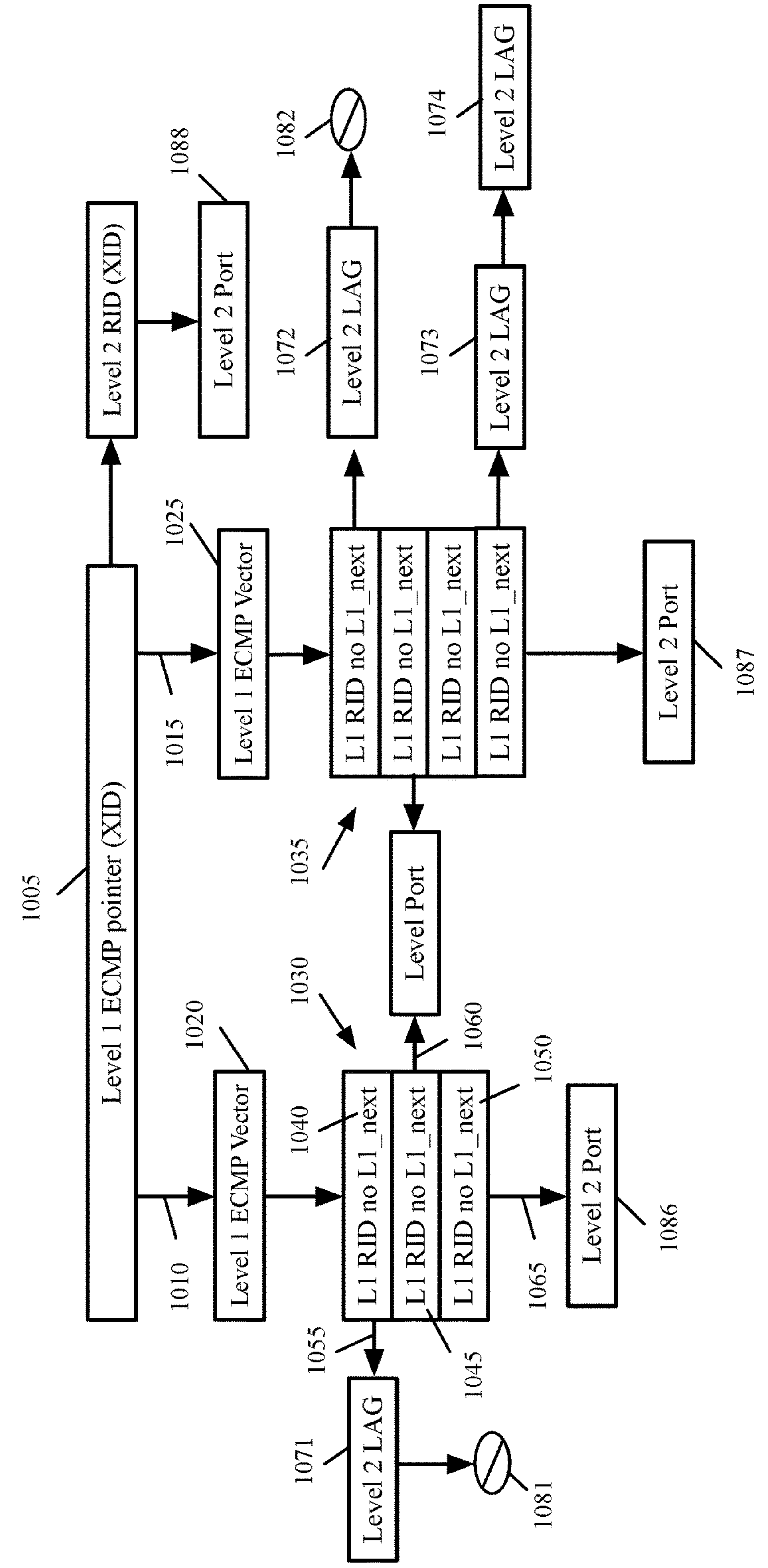
FIG. 10 conceptually illustrates a portion of a multicast tree used for selecting an alternative path when an ECMP path selected by the packet replicator is marked as failed.

FIG. 10 conceptually illustrates a portion of a multicast tree used for selecting an alternative path when an ECMP path selected by the packet replicator is marked as failed. A level 1 ECMP pointer node is used to choose one logical port from a set of logical ports. The level 1 ECMP Pointer (XID) node 1005 includes 2 level 1 ECMP vector node pointers 1010 and 1015. A table ID field in PH is used to select one of the level 1 ECMP vector nodes 1020-1025.

Each level 1 ECMP vector node 1020-1025 includes a vector field that has a group of bits. There is one bit for each logical port in the ECMP group. A logical port can be in any pipeline (or in several pipelines). A bit is set to on (e.g., 1) if the port is eligible for selection otherwise the bit is set to off (e.g., 0). Each level 1 ECMP vector node 1020-1025 also includes a length field that indicates the number of bits in the vector.

The walker chooses one of the bits that is set to 1 (e.g., by using resilient hashing). The index of the selected bit is then be used as an offset into a table (e.g., tables 1030 or 1035) to select a "level 1 RID without level 1 next node" (such as nodes 1040-1050) that has a level 2 next pointer (such as pointers 1055-1065) to the start of the level 2 chain for the node.

In the example of FIG. 10, the ingress table ID in PH indicates table 1035 should be selected. The level 1 ECMP vector node was originally configured to choose one from four possible groups (e.g., the length field is set to 3 (number of bits minus one)). However, in this example the control plane software has deactivated the third entry by setting the corresponding bit to zero in the level 1 vector field. The software could have changed the vector, changed the length field to 2, and repacked the table. However, it is faster to just disable the port especially if it might be reactivated in a short while. Also, repacking would change the port chosen by some existing flows, which causes the loss of resiliency.

In this example, the level 1 walker has to choose one port from the three eligible ports at offsets 0, 1 and 3. The choice of index (port group) is determined by Hash 1 value provided in the PH (as shown by 515 in FIG. 5). This ensures that the same port is chosen for packets from a given flow (the hash values remain the same for all packets in the flow).

The level 1 ECMP logical group selection is as specified below:

```
index_vec = H1 mod (Len+1) //H1 mod 4 for 4 pipelines
vector_pack = make_index_vec(L1_vector) // [0,1,3]
len_pack = len(vector_pack) //3len
index_pack = H1 mod len_pack //H1 mod 3
if (L1_vector[index_vec])
   index = index_vec
else
   index = vector_pack[index_pack]
```

The mod function (A mod B) may be implemented as (A*B)>>len(A) which is fast for small values of B. The index specifies the level 1 RID node to be used. Once that node is selected, that RID is used for all of the level 2 nodes in the ensuing level 2 chain. An ECMP port group might be spread across several pipelines. Software must ensure that all pipes choose the same final node. If the chosen port has no physical level 2 ports in the pipeline then the level 2 next entry in the selected RID for this pipe is zero.

E. Prune Port Mask Calculation

The following is an example of a pseudo code for calculating the prune port mask in some embodiments.

```
if (L1 Node XID == ingress XID)
   skip the entire RID tree
else
   if ((ingress RID == RID register) | (ingress RID == L1 Node RID))
      prune_port_mask = prune_port_table[ingress YID]
   else
      prune_port_mask = '0
```

The parameter prune port mask is used in the level 2 node vector and LAG port selection.

F. Level 2 Physical Port Selection

The following is an example of a pseudo code for calculating both LAG and L2 Vector, the live ports vector for level 2 physical port selection.

```
if (hw_port_liveness_en)
   live_ports = ~port_mask & port_down
else
   live_ports = ~port_mask
```

where ~is logical not and & is logical AND operator.

A level 2 LAG node (such as nodes 1071-1074 in FIG. 10) is used to select one physical port from a set of physical ports. The table ID in PH is used to select one of the LIT and LAG mask registers to use. Each level 2 LAG node includes a LAG index that points to an entry in the LIT. The level 2 walker chooses one of the physical ports in the port vector. The choice of physical port is determined by the Hash 2 value provided in ingress PH (as shown by 520 in FIG. 5).

The physical port selection is as specified below:

```
//Hash function over LAG entry
vector_pack = make_index_vec(LAG Bit Map entry)
len_pack = Number of Left Port + len(vector_pack) + Number of Right Port
index_pack = H2 mod len_pack (13-bit mod 13-bit)
//Hash function over LAG entry with liveness mask
vector_pack_mask = make_index_vec(LAG Bit Map entry & live_ports)
len_pack_mask = len(vector_pack_mask)
index_pack_mask = H2 mod len_pack_mask (13-bit mode 9-bit)
//Select egress port
if ((index_pack < # of Right Port) | (index_pack >= (len(vector_pack) + # of Right Port)))
      egress_port = NULL;
else if (live_ports[vector_pack[index_pack-# of Right Port]] |
   ((LAG Bit Map entry & live_ports) == '0))
      egress_port = vector_pack[index_pack - Number of Rigth Port];
else
      egress_port = vector_pack_mask[index_pack_mask];
//Select final egress port after pruning and then liveness check and backup port lookup
if (~(egress_port = NULL) & ~prune_port_mask[egress_port])
      if (backup_port_en & ~live_ports[egress_port])
         final_egress_port = backup_port_table[egress_port];
      else
         final_egress_port = egress_port;
      else
         final_egress_port =NULL;
//Send
if ((final_egress_port == NULL) | (final_egress_port not in PRE pipe))
      No packet replication
else
      Send packet to final_egress_port
```

The mod function (A mod B) can be implemented as (A*B)>>len(A) which is fast for small values of B.

The chosen port might be located in the local pipeline or in another pipeline. If the chosen port is not in the local pipeline, then the packet is not replicated for that port and the walker follows the level 2 next pointer (or terminates this level chain if the level 2 next pointer is null, e.g., such shown by 1081 and 1082).

The selection for physical level 2 nodes (such as node 1086 and 1088) is as follows:

```
//Select egress port
if (L2 vector[index from 0 to 71])
   egress_port == {Node pipe, index }
//Select final egress port after pruning, liveness check, and backup port lookup
if (~prune_port_mask[egress_port])
   if (backup_port_en & ~live_ports[egress_port])
      final_egress_port = backup_port_table[egress_port];
   else
      final_egress_port = egress_port;
```

-continued

```
else
   final_egress_port = NULL;
//Send
if ((final_egress_port == NULL) | (final_egress_port not in PRE pipe))
   no packet replication
else
   send packet to final_egress_port
```

G. Determining an Alternative Egress Port for a Single Failed Physical Port

The forwarding element in some embodiments includes multiple ingress and egress pipelines. Each egress pipeline has multiple egress ports. In some embodiments, each egress port is associated with a backup port. An egress port and the associated backup egress port may or may not be in the same egress pipeline. When a packet replicator selects a physical egress port that is a single physical port (i.e., the egress port is not associated with a LAG) and the physical port is marked as failed, the packet replicator selects (e.g., as described above by reference to operation 260 in FIG. 2) the backup port as the physical egress port to send the multicast packet to the multicast group member.

Figure 11:
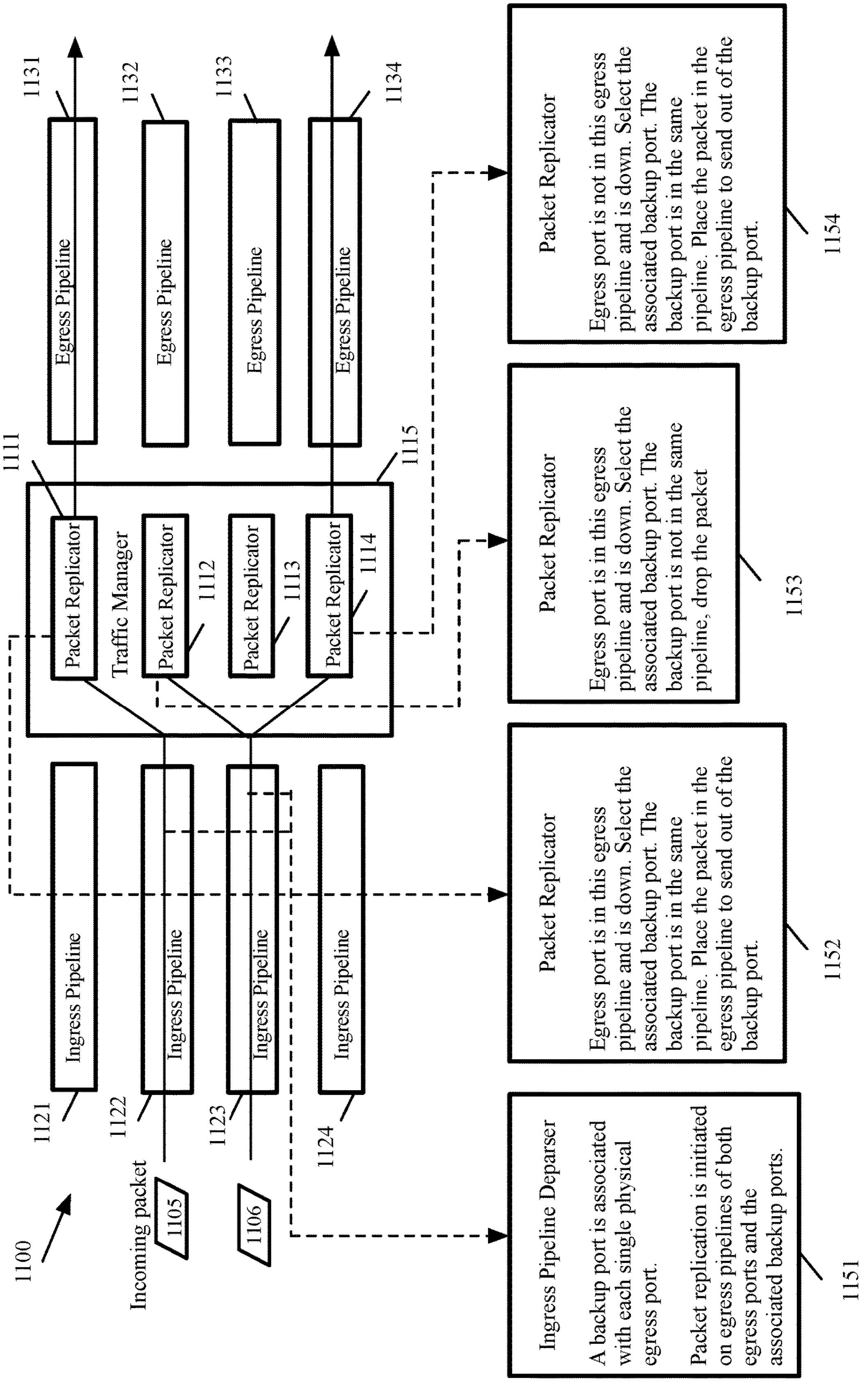
FIG. 11 conceptually illustrates a portion of a hardware forwarding element used for performing failover from a single failed physical egress port in some embodiments.

FIG. 11 conceptually illustrates a portion of a hardware forwarding element used for performing failover from a single failed physical egress port in some embodiments. As shown, the forwarding element 1100 includes several ingress pipelines 1121-1124 and several egress pipelines 1131-1134. Traffic manager 1115 includes a packet replicator 1111-1114 for each egress pipeline 1131-1134, respectively. For simplicity the packet handle generators, QACs, and QLCs of the traffic manager are not shown in this figure. Although four pipelines are shown, it should be understood that the forwarding element may include any number of pipelines.

The example of FIG. 11 shows a multicast packet 1105 received at the ingress pipeline 1122. The ingress pipeline 1122 deparser sends the packet to traffic manager 1115. The packet handle generator 470 in each pipeline (shown in FIG. 4) generates a packet handle (PH) and sends the packet handle to the corresponding QAC 420 (shown in FIG. 4) in the pipeline. The QAC examines the PH and sends the PH to the corresponding packet replicator 1111-1114 when the PH indicates that the packet is a multicast packet and/or the packet has to be copied outside the data plane for access by the forwarding element's processor (not shown). The PH for a multicast packet is therefore received by every packet replicators 1111-1114.

Every packet replicator uses the same algorithm to determine the same physical egress port for sending the multicast packet to each multicast destination. Every packet replicator including packet replicator 1111, therefore, determines the same physical egress port for multicasting the packet to a particular multicast destination. In this example, the egress port and the backup port are both on the same egress pipeline 1131 as the packet replicator 1111.

Each packet replicator, including packet replicator 1131, makes a copy of the PH for each determined physical port. The packet replicator places the identification of the physical port in the PH with other information required to generate a replicate copy of the packet as described above. The packet replicator sends the PH back to the QAC in the corresponding pipeline. If the physical port is in the same pipeline, the QAC queues the packet handle to the specified port. If the physical port is not in the same pipeline, the QAC drops the packet handle and allows the QAC, which is in the same pipeline as the physical port to queue the PH. Since the packet replicators of every pipeline receive the PHs of every multicast packet and the packet replicates of all pipelines use the same methods and hash values to identify a physical egress ports, the PH generated by the packet replicator that is in the same pipeline as the identified physical egress port is used to generate the replicated packet.

The traffic manager then reads the PHs from each port queue and fetches the packets from the packet buffer starting from the address (or the pointer) given in the PH. Packet bytes are then sent to egress pipeline. When all copies of a packet are sent to the corresponding egress pipelines, the packet buffer space is garbage collected as free space. Each replicated copy is then transmitted to the multicast member through the corresponding identified physical port.

In this example, when the egress port identified by packet replicator 1111 is marked as failed, the packet replicator selects the backup port as the egress port. Since the backup port in this example is in the same pipeline (as indicated by 1152), packet replicator 1131 places the relevant parameters in the PH and the traffic manager places a copy of the multicast packet in the egress pipeline 1131 to be transmitted from the backup port to the multicast destination.

The example of FIG. 11 also shows a multicast packet 1106 is received at the ingress pipeline 1123. The ingress pipeline 1123 deparser sends the packet to traffic manager 1115, which initiates packet replication by sending a PH to every packet replicator 1111-1114.

Every packet replicator including packet replicators 1112 and 1114 determines the same physical egress port for multicasting the packet. In this example, the egress port is in egress pipeline 1132 and the backup port is in the egress pipeline 1134.

When the egress port is operational, packet replicator 1132 places the relevant parameters in the PH and the traffic manager 1115 places a copy of the multicast packet in the egress pipeline 1132 to be transmitted to the multicast destination through the selected egress port. When the egress port is marked as failed, packet replicator 1112 (as shown by 1153) determines that the backup port associated with the failed egress port is not in the same pipeline. The Packet replicator 1152, therefore, drops the packet (e.g., sets a drop flag (such as drop flag 580) in the PH to indicate to the corresponding QAC that the PH should not be used in this pipeline to send a replica of the multicast packet to the multicast destination).

Packet replicator 1114 (as shown by 1154) determines that the egress port is not in the same pipeline and is marked as failed. Packet replicator 1114, however, determines that the backup port associated with the failed egress port is in the same pipeline. Packet replicator 1114, therefore, places the relevant parameters in the PH and the traffic manager 1115 places a replica of the multicast packet in egress pipeline 1134 for transmission to the multicast destination through the backup port.

Figure 12:
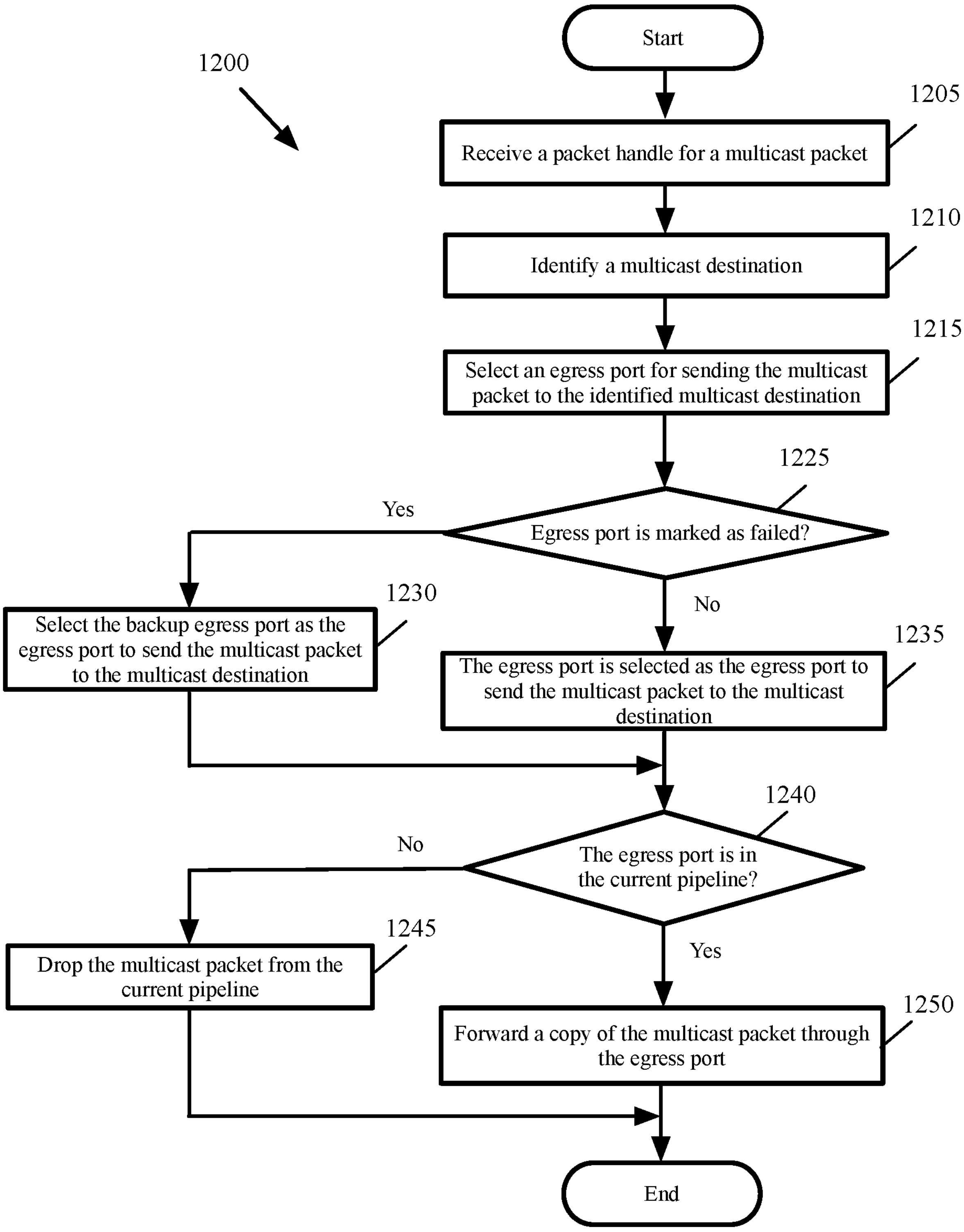
FIG. 12 conceptually illustrates a process for sending a copy of a multicast packet to a multicast destination in some embodiments.

FIG. 12 conceptually illustrates a process 1200 for sending a copy of a multicast packet to a multicast destination in some embodiments. The process is performed by a packet replicator such as packet replicator 1111-1114 in FIG. 11. As shown, the process receives (at 1205) a packet handle for multicast packet. Each multicast packet identifies one or more multicast groups. Each multicast group includes one or more multicast members, which are network nodes that have joined the multicast group. The process identifies (at 1210) one of the multicast destinations to send a replica of the packet.

The process then selects (at 1215) an egress port for sending a copy of the multicast packet to the identified multicast destination. The process then determines (at 1225) whether the egress port is marked as failed. For instance, the process checks the status of the egress port in a data structure such as data structure 310 in FIG. 3B that is used to store the ports status. When the egress port is not marked as failed, process 1200 selects (at 1235) the egress port as the port to send the multicast packet to the multicast destination. Otherwise, the process selects (at 1230) the associated backup port as selected as the egress port to send the multicast packet to the multicast destination.

The process then determines (at 1240) whether the egress port is in the same pipeline as the packet replicator that has received the packet in operation 1220. For instance, as described above by reference to FIG. 11, a copy of the multicast packet is placed in an egress pipeline when (i) the egress port is operational and is in the egress pipeline associated with the packet replicator or (ii) the egress port is down and the backup port is in the egress pipeline associated with the packet replicator.

When the egress port is in the same pipeline as the packet replicator, the process forwards (at 1250) the multicast packet through the egress port to the multicast destination. The process then ends. Otherwise, the process drops (at 1245) the multicast packet from the current pipeline. The process then ends.

H. Determining an Alternative Egress Port for a Failed Physical Port in a LAG

In some embodiments, some physical egress ports are members of a LAG. For each destination multicast member, the ingress pipeline that receives the multicast packet determines an egress port to send the multicast packet to the multicast member. When the determined egress port is part of a LAG, the ingress pipeline sends the packet handle of the multicast packet to the packet replicators associated with the egress pipelines of every egress port in the LAG. When an egress port is down, the packet replicators associated with each egress port in the LAG performs resilient hashing to determine an alternative egress port in the LAG.

Since the packet replicators use the same resilient hashing algorithm, all packet replicators determine the same alternative egress port for a particular failed egress port. The packet replicator associated with the egress pipeline of the alternative egress port places a replica of the multicast packet in the egress pipeline to transmit from the alternative egress port. The packet replicators associated with all other egress pipelines drop the multicast replica packet intended for the failed egress port.

Figure 13:
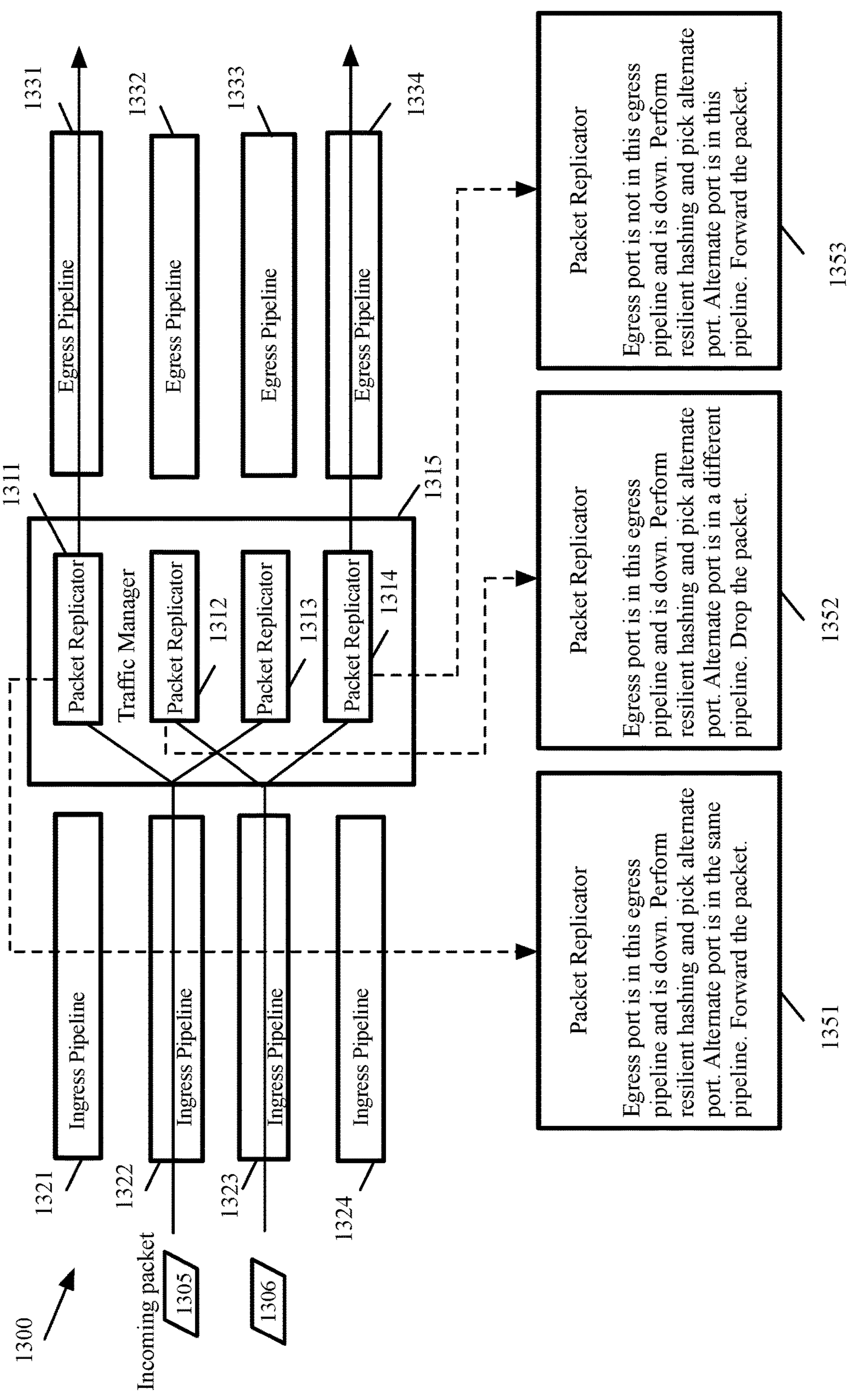
FIG. 13 conceptually illustrators a portion of a forwarding element used for performing failover from a failed egress port that is member of a LAG in some embodiments.

FIG. 13 conceptually illustrators a portion of a forwarding element used for performing failover from a failed egress port that is member of a LAG in some embodiments. As shown, the forwarding element 1300 includes several ingress pipelines 1321-1324 and several egress pipelines 1331-1334. Traffic manager 1315 includes a packet replicator 1311-1314 for each egress pipeline 1331-1334, respectively. For simplicity the packet handle generators, QACs, and QLCs of the traffic manager are not shown in this figure. Although four pipelines are shown, it should be understood that the forwarding element can include any number of pipelines.

The example of FIG. 13 shows a multicast packet 1305 is received at the ingress pipeline 1322. The ingress pipeline deparser sends the packet to traffic manager 1315, which initiates packet replication by sending a PH to packet replicator 1311-1314 connected to every egress pipelines 1331-1334 of the forwarding element.

Every packet replicator including packet replicator 1311 determines the same physical egress port to send the multicast packet to one of the multicast group members. In this example, the packet replicator 1311 determines that the egress port has failed. The packet replicator uses resilient hashing to determine an alternative port in the LAG group. When the alternative port is also in the same pipeline (as indicated by 1351), packet replicator places the relevant parameters in the PH and the traffic manager 1315 places a copy of the multicast packet in the egress pipeline 1331 to be transmitted to the multicast destination through the alternative port.

The example of FIG. 13 also shows a multicast packet 1306 is received at the ingress pipeline 1323. Every packet replicator including packet replicator 1312 determines the same physical egress port to send the multicast packet to one of the multicast group members. In this example, the packet replicator 1312 determines that the egress port is in the same pipeline 1332 and has failed. The packet replicator uses resilient hashing to determine an alternative port in the LAG group. The alternative port in this example is not in the same pipeline (as indicated by 1352). Packet replicator 1312 drops the packet (e.g., sets a drop flag (such as drop flag 580) in the PH to indicate to the corresponding QAC that the PH should not be used in this pipeline to send a replica of the multicast packet to the multicast destination).

Packet replicator 1314 (as shown by 1353) determines that the egress port is not in the same pipeline and is marked as failed. Packet replicator 1314 uses resilient hashing to determine an alternative egress port. In this example, the packet replicator 1314 determines that the alternative port is in the same pipeline. Packet replicator 1314, therefore, places the relevant parameters in the PH and the traffic manager 1315 places a replica of the multicast packet in egress pipeline 1334 for transmission to the multicast destination through the alternative port.

Figure 14:
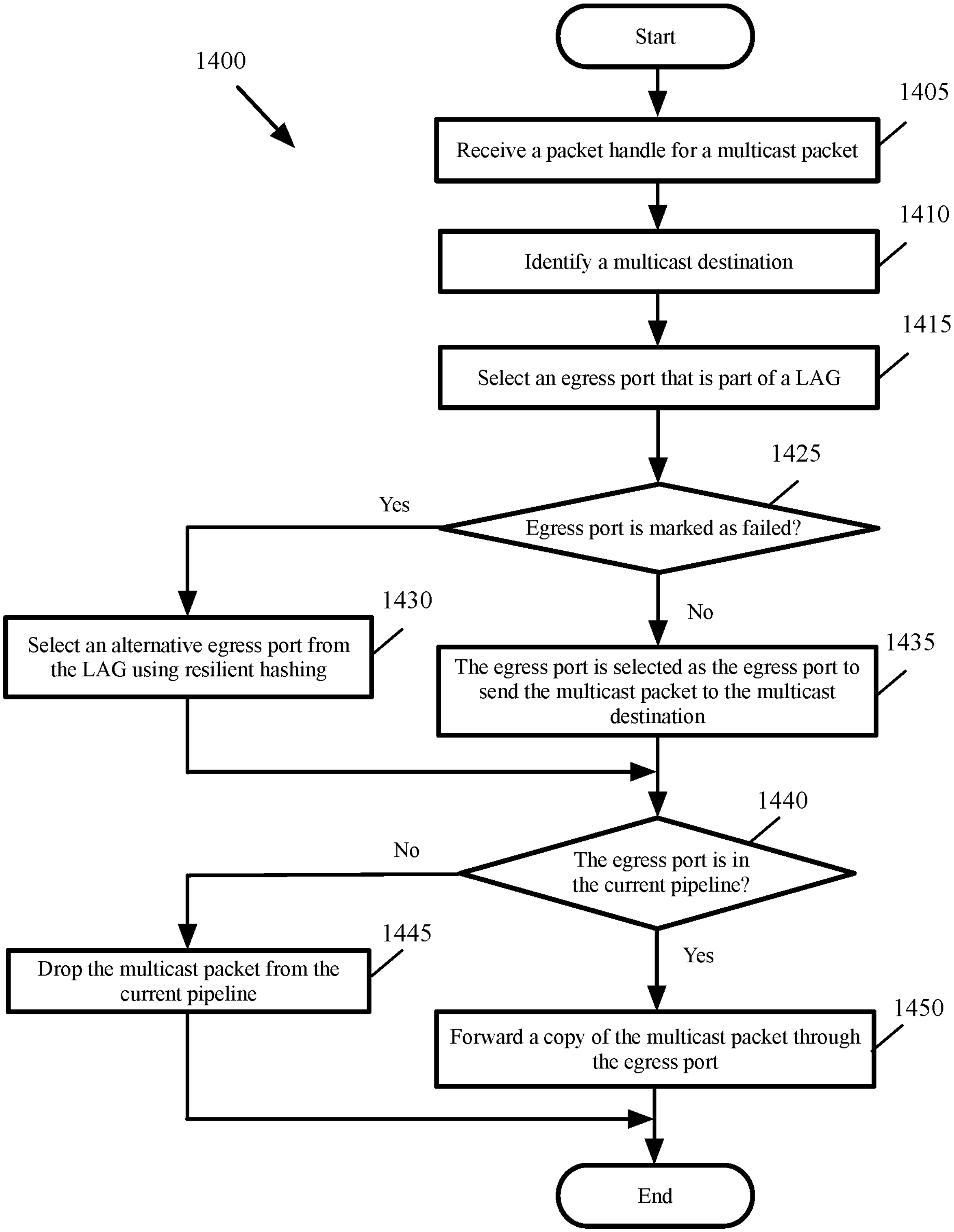
FIG. 14 conceptually illustrates a process for sending a copy of a multicast packet to a multicast destination through a LAG port in some embodiments.

FIG. 14 conceptually illustrates a process 1400 for sending a copy of a multicast packet to a multicast destination through a LAG port in some embodiments. The process in some embodiments is performed by a packet replicator such as packet replicators 1311-1314 in FIG. 13. As shown, the process receives (at 1405) a packet handle for multicast packet. Each multicast packet identifies one or more multicast groups. Each multicast group includes one or more multicast members, which are network nodes that have joined the multicast group. The process identifies (at 1410) one of the multicast destinations to send a replica of the packet.

The process then selects (at 1415) an egress port that is a member of a LAG for sending a copy of the multicast packet to the identified multicast destination. The process then determines (at 1425) whether the egress port is marked as failed. For instance, the process checks the status of the egress port in a data structure such as data structure 310 in FIG. 3B that is used to store the ports status. When the egress port is not marked as failed, the process selects (at 1435) the egress port as the port to send the multicast packet to the multicast destination. Otherwise, the process selects (at 1430) another egress port in the LAG using resilient hashing as the egress port to send the multicast packet to the multicast destination. The process then determines (at 1440) whether the egress port is in the same pipeline as the packet replicator that has received the packet in operation 1420. For instance, as described above by reference to FIG. 13, the packet replicator places a copy of the multicast packet in an egress pipeline when (i) the egress port is operational and is in the egress pipeline associated with the packet replicator or (ii) the egress port is down and the alternative LAG port is in the egress pipeline associated with the packet replicator.

When the egress port is in the same pipeline as the packet replicator, the process forwards (at 1450) the multicast packet through the egress port to the multicast destination. The process then ends. Otherwise, the process drops (at 1445) the multicast packet from the current pipeline. The process then ends.

II. Computer System

Figure 15:
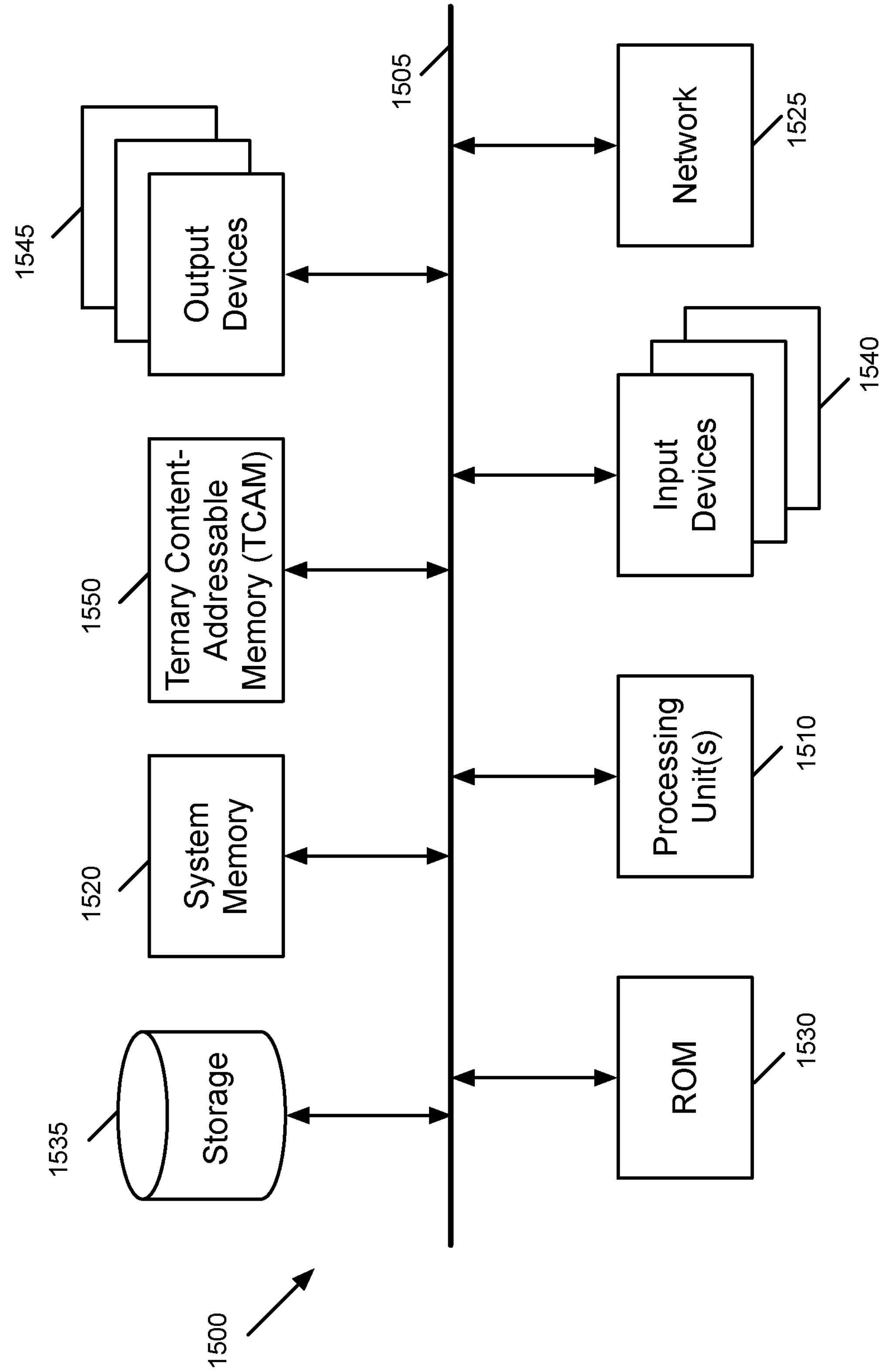
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, system memory 1520, read-only memory (ROM) 1530, permanent storage device 1535, input devices 1540, output devices 1545, and TCAM 1550.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1520 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 12, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A physical forwarding element, comprising:
- a plurality of egress pipelines; and
- a plurality of packet replicators, at least two of the plurality of packet replicators associated with different egress pipelines, at least one egress pipeline comprising a set of physical egress ports;
- at least one packet replicator configured to:
  - receive a data structure associated with a multicast packet received at the physical forwarding element, the data structure to identify a multicast group comprising a set of members for receiving the multicast packet;
  - identify a first physical egress port of a first egress pipeline to send the multicast packet to a member of multicast group, the first physical egress port a member of a plurality of physical egress ports in a link aggregation group (LAG);
  - determine that the first physical egress port is not operational;
  - identify a second physical egress port in the LAG to send the multicast packet to the member of the multicast group;
  - provide, when the packet replicator is connected to a same egress pipeline as the second physical egress port, an identification of the second physical egress port to the egress pipeline to send the multicast packet to the multicast group member; and
  - drop the multicast packet when the packet replicator is not connected to the same egress pipeline as the second physical egress port.

2. The physical forwarding element of claim 1, wherein at least one packet replicator is further configured to receive a plurality of hash values calculated on a plurality of fields of the multicast packet that uniquely identify a packet flow for the multicast packet, wherein:
- identify the first physical egress port comprises using a first hash value in the plurality of hash values to identify the first physical egress port from the plurality of physical egress ports of the LAG, and
- identify the second physical egress port comprises using a second hash value in the plurality of hash values to identify the first physical egress port from the plurality of physical egress ports of the LAG.

3. The physical forwarding element of claim 2, wherein the plurality of the fields of the multicast packet that uniquely identifies the packet flow comprises (i) a source Internet protocol (IP) address, (ii) a destination IP address, (iii) a source port, (iv) a destination port, and (v) a protocol used to transmit the multicast packet.

4. The physical forwarding element of claim 1 further comprising a set of monitoring units configured to:
- receive a hardware signal when a physical egress port fails; and
- send a feedback signal to an ingress pipeline of the forwarding element,
- at least one ingress pipeline configured to:
  - receive the feedback signal; and
  - set a status flag associated with the physical egress port at a data plane of the physical forwarding element to indicate the physical egress port has failed,
- wherein determine that the first physical egress port is not operational comprises checking the status flag associated with the failed egress port.

5. The physical forwarding element of claim 1, wherein the member of the multicast group is a first member of the multicast group, at least one packet replicator further configured to:
- identify a particular physical egress port to send the multicast packet to a second member of the multicast group;
- determine that the particular physical egress port is not operational;
- select a backup port associated with the particular physical egress port to send the multicast packet to the second member of the multicast group;
- provide, when the packet replicator is connected to a same egress pipeline as the backup port, an identification of the backup port to the egress pipeline to send the multicast packet to the second member of the multicast group; and
- drop the multicast packet when the packet replicator is not connected to the same egress pipeline as the backup port.

6. The physical forwarding element of claim 1 further comprising:
- a storage to store a multicast tree associated with the multicast group at the forwarding element, the multicast tree to identify a plurality of physical egress ports to send multicast packets from the forwarding element to members of the multicast group;
- wherein identify the first physical egress port comprises scan the multicast tree to identify a physical egress port to send the multicast packet to the multicast group member.

7. The physical forwarding element of claim 6, wherein the identify the first physical egress port comprises:
- identify a first node in the multicast tree as a node associated with the LAG for forward the multicast packet to the multicast group member, the node comprising a pointer to a LAG table; and
- use the pointer as an index to the LAG table to identify the first physical egress port as the physical egress port to forward the multicast packet to the multicast group member.

8. The physical forwarding element of claim 1 further comprising a plurality of ingress pipelines,
- at least one ingress pipeline of the plurality of ingress pipelines configured to:
  - generate said data structure when the ingress pipeline receives a multicast packet; and
  - send the data structure to at least one of the plurality of packet replicators of the forwarding element.

9. The physical forwarding element of claim 1, wherein the physical forwarding element comprises one or more of: a network router and a network switch.

10. The physical forwarding element of claim 1, wherein a data plane of the forwarding element is to perform: the receive, the identify the first physical egress port, the determine, the identify the second physical egress port, the provide, and the drop.

11. An apparatus comprising:

means for accessing a packet;

means for identifying one or more egress ports to transmit the packet based on data identifying a multicast group associated with the packet, wherein a link aggregation group (LAG) is associated with at least one egress port of the one or more egress ports associated with the identified multicast group; and means for, based on unavailability of an egress port associated with the LAG, re-allocating one or more packets associated with the unavailable egress port among one or more available egress ports associated with the LAG but maintain association between one or more packets and at least one other available egress port associated with the LAG.

12. The apparatus of claim 11, wherein the unavailability of an egress port associated with the LAG is based on failure of the egress port.

13. The apparatus of claim 11, wherein a table is to associate the LAG with the at least one egress port of the one or more egress ports.

14. The apparatus of claim 11, comprising means for causing multicast transmission of the packet based on the data identifying a multicast group associated with the packet.

15. The apparatus of claim 11, comprising:

means for interfacing with a memory device coupled to access the packet from the memory device.

16. The apparatus of claim 11, comprising:

the one or more egress ports to transmit the packet to a media.

17. The apparatus of claim 11, comprising:

one or more ingress ports, wherein at least one of the one or more ingress ports is to receive the packet.

18. The apparatus of claim 11, comprising a switch, wherein the switch comprises:

the means for accessing the packet and the means for identifying one or more egress ports to transmit the packet based on data identifying a multicast group associated with the packet;

one or more ingress ports, wherein at least one of the one or more ingress ports is to receive the packet, the one or more egress ports to transmit the packet to a media.

19. The apparatus of claim 11, comprising:

at least one packet processor comprising the means for accessing the packet and the means for identifying one or more egress ports to transmit the packet based on data identifying a multicast group associated with the packet and a means for managing traffic to manage transmission of the packet and at least one other packet.

* * * * *